(12) United States Patent
Asano

(10) Patent No.: US 8,179,016 B2
(45) Date of Patent: May 15, 2012

(54) MOTOR AND COMPRESSOR

(75) Inventor: Yoshinari Asano, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 236 days.

(21) Appl. No.: 12/440,999

(22) PCT Filed: Sep. 12, 2007

(86) PCT No.: PCT/JP2007/067741
§ 371 (c)(1),
(2), (4) Date: Mar. 12, 2009

(87) PCT Pub. No.: WO2008/035599
PCT Pub. Date: Mar. 27, 2008

(65) Prior Publication Data
US 2009/0230811 A1   Sep. 17, 2009

(30) Foreign Application Priority Data

Sep. 19, 2006   (JP) .................................. 2006-252505

(51) Int. Cl.
*H02K 1/22* (2006.01)
*H02K 21/12* (2006.01)

(52) U.S. Cl. .................... 310/268; 310/91; 310/216.001; 310/156.32; 310/49.22; 310/49.42

(58) Field of Classification Search .................. 310/268, 310/216.001, 91, 156.32, 156.35, 112, 216.66, 310/49.51; *H02K 1/22, 21/12*
See application file for complete search history.

(56) References Cited

U.S. PATENT DOCUMENTS

| | | | |
|---|---|---|---|
| 2,824,275 A * | 2/1958 | Kober | 322/27 |
| 4,604,540 A * | 8/1986 | Fukami | 310/154.06 |
| 6,445,105 B1 * | 9/2002 | Kliman et al. | 310/268 |
| 6,628,038 B1 * | 9/2003 | Shikayama et al. | 310/268 |
| 6,803,696 B2 * | 10/2004 | Chen | 310/268 |
| 6,977,454 B2 * | 12/2005 | Hsu | 310/171 |
| 7,888,904 B2 * | 2/2011 | Mularcik | 318/724 |
| 2002/0153792 A1 * | 10/2002 | Isozaki et al. | 310/112 |
| 2003/0071537 A1 * | 4/2003 | Chen | 310/268 |
| 2003/0189388 A1 * | 10/2003 | Hashimoto et al. | 310/268 |
| 2005/0093393 A1 * | 5/2005 | Hirzel | 310/268 |
| 2005/0127769 A1 * | 6/2005 | Minagawa | 310/156.32 |
| 2005/0210891 A1 * | 9/2005 | Matsumoto et al. | 62/114 |
| 2006/0012263 A1 * | 1/2006 | Smith et al. | 310/268 |
| 2006/0055271 A1 * | 3/2006 | Kaneko | 310/208 |
| 2006/0208686 A1 * | 9/2006 | Takada | 318/801 |

(Continued)

FOREIGN PATENT DOCUMENTS

JP   62-173961 A   7/1987
JP   07-336967 A   12/1995

(Continued)

*Primary Examiner* — John K Kim
(74) *Attorney, Agent, or Firm* — Global IP Counselors

(57) ABSTRACT

A motor includes a rotating shaft, a rotor fixed to the rotating shaft and first and second stators facing each other on opposite axial sides of the rotor with a gap in between. Each of the first and second stators includes a back yoke, teeth circumferentially arranged on a gap side of a respective one of the back yokes and coils wound around the teeth. The back yoke of the first stator has a portion facing an end face of the rotating shaft, and the back yoke of the second stator has a shaft hole through which the rotating shaft passes. The thickness Ty1 of the back yoke of the first stator is set smaller than the thickness Ty12 of the back yoke of the second stator.

30 Claims, 18 Drawing Sheets

U.S. PATENT DOCUMENTS

2006/0273676 A1* 12/2006 Naruse et al. ............ 310/156.32
2007/0194649 A1* 8/2007 Schafer et al. ........... 310/156.32
2007/0200445 A1* 8/2007 Yamagiwa ............... 310/156.32
2009/0230811 A1* 9/2009 Asano .................... 310/216.001

FOREIGN PATENT DOCUMENTS

| | | |
|---|---|---|
| JP | 2005-318782 A | 11/2005 |
| JP | 2005-341696 A | 12/2005 |
| WO | WO 2007089529 A2 * | 8/2007 |

* cited by examiner

MOTOR AND COMPRESSOR

CROSS-REFERENCE TO RELATED APPLICATIONS

This U.S. National stage application claims priority under 35 U.S.C. §119(a) to Japanese Patent Application No. 2006-252505, filed in Japan on Sep. 19, 2006, the entire contents of which are hereby incorporated herein by reference.

TECHNICAL FIELD

The present invention relates to a motor and a compressor using the motor.

BACKGROUND ART

Conventionally, there has been an axial gap motor with first and second stators facing each other through slight air gaps on both axial sides of a rotor fixed to a rotating shaft (refer to, for example, JP 2005-318782A). The axial gap motor has advantages that a radial force attributable to a rotating magnetic field is not generated, vibration and noise attributable to center alignment or the like can be prevented, and that its axial dimension can be reduced for miniaturization of the motor. In addition, the axial gap motor has an advantage that suction force (an axial force) acting on the rotor is cancelled in the air gaps on both axial sides of the rotor, thereby reducing the bearing loss and extending the bearing life.

However, the axial gap motor has a problem that the ability of reducing the axial dimension, which is a precious advantage of the axial gap motor, is deteriorated by the stators placed on both axial sides of the rotor.

SUMMARY OF INVENTION

It is therefore an object of the present invention to provide a motor which can be miniaturized in a structure with stators facing each other on both axial sides of a rotor, and a compressor using the motor.

In order to solve the problem, a motor according to a first aspect of the present invention comprises a rotating shaft, a rotor fixed around the rotating shaft, and first and second stators facing each other through air gaps on both axial sides of the rotor, wherein:
the first and second stators each comprise a back yoke, teeth arranged circumferentially and located on the air gap side of the respective back yokes, and coils wound around the teeth;
the back yoke of the first stator has a portion facing an end face of the rotating shaft;
the back yoke of the second stator has a shaft hole which the rotating shaft passes through; and
the back yoke of the first stator has a thickness $Ty1$ less than a thickness $Ty2$ of the back yoke of the second stator.

In the motor with the above configuration, the back yoke of the first stator, which has a portion facing an end face of the rotating shaft, may be of a structure in which the back yoke of the first stator has no hole or a structure in which the back yoke has a hole although the hole is less than the shaft hole which the rotating shaft passes through of the back yoke of the second stator. In such a motor structure, if the outside diameter of the back yoke of the first stator is the same as that of the back yoke of the second stator, the radial dimension of the back yoke of the first stator is longer than the radial dimension of the back yoke of the second stator having a shaft hole. Thus, even if the thickness $Ty1$ of the back yoke of the first stator is made less than the thickness $Ty2$ of the back yoke of the second stator, it is possible to ensure the same sectional area of the back yoke of the first stator as that of the back yoke of the second stator, whereby the reluctance of the first stator can be made about the same as the reluctance of the second stator so that no thrust force acts on the rotor. For this reason, the motor can be miniaturized in a structure with stators facing each other on both axial sides of the rotor.

In a second aspect of the present invention, the back yoke of the first stator has a hole centering on an axis, and the hole of the back yoke of the first stator has a radius $Ri1$ less than a radius $Ri2$ of the shaft hole of the back yoke of the second stator.

According to this aspect, the radius $Ri1$ of the hole centering on the axis provided in the back yoke of the first stator is less than the radius $Ri2$ of the shaft hole of the back yoke of the second stator, so that the radial dimension of the back yoke of the first stator can be longer than that of the back yoke of the second stator.

In a third aspect of the present invention, an outside radius $Ro$ of the back yoke of the first stator is about the same as an outside radius of the back yoke of the second stator, and the following condition is satisfied.

$$(Ro-Ri1)Ty1 = (Ro-Ri2)Ty2$$

According to this aspect, because the condition is satisfied, a sectional area of the back yoke of the first stator along a plane including the axis of the back yoke becomes the same as that of the second stator.

In a fourth aspect of the present invention, a magnetic flux passing through magnetic materials provided on the rotor forms a magnetic circuit axially penetrating the first stator and the second stator through the magnetic materials.

According to this aspect, because the magnetic flux passing through the magnetic materials provided on the rotor forms a magnetic circuit axially penetrating the first stator and the second stator through the magnetic materials, the magnetic flux passing through the first stator becomes the same as the magnetic flux passing through the second stator. This feature, combined with the reluctance of the first stator being the same as that of the second stator, allows a thrust force acting on the rotor to be cancelled.

In a fifth aspect of the present invention, the motor further comprises a bearing supporting the rotating shaft in such a manner that the rotating shaft rotates freely, said bearing being located nearer to the second stator than to the rotor.

According to this aspect, a load is connected to the second stator side of the rotating shaft, so that the rotating shaft can be supported with stability by providing the bearing on the second stator side rather than the rotor side of the shaft.

In a sixth aspect of the present invention, the motor satisfies the following conditions:

$$Rto1 < Rto2 \text{ and } Rti1 < Rti2,$$

where
$Rto1$ is a radius of a circle connecting outermost peripheries, relative to the rotating shaft, of the teeth of the first stator,
$Rti1$ is a radius of a circle connecting innermost peripheries, relative to the rotating shaft, of the teeth of the first stator,
$Rto2$ is a radius of a circle connecting outermost peripheries, relative to the rotating shaft, of the teeth of the second stator, and
$Rti2$ is a radius of a circle connecting innermost peripheries, relative to the rotating shaft, of the teeth of the second stator.

According to this aspect, because the conditions are satisfied, the teeth of the first stator are shifted as a whole to the radial inside relative to the teeth of the second stator. Thus, spaces on the inner periphery sides of the teeth of the first stator are effectively used.

In a seventh aspect of the present invention, the following condition is satisfied.

$$(Rto1-Rti1)>(Rto2-Rti2)$$

According to this aspect, the radial length of the teeth of the first stator shifted to the radial inside is longer than that of the teeth of the second stator, so that the sectional area along a plane orthogonal to the rotating shaft of the first stator can be made about the same as that of the second stator.

In an eighth aspect of the present invention, the following condition is satisfied.

$$Wc1>Wc2,$$

where
  $Wc1$ is a radial width of the coils of the first stator, and
  $Wc2$ is a radial width of the coils of the second stator.

According to this aspect, the condition is satisfied to make the radial width of the coils of the first stator longer than that of the coils of the second stator, so that the utilization of a space on the first stator side increases.

In a ninth aspect of the present invention, the following condition is satisfied.

$$Lc1<Lc2,$$

where
  $Lc1$ is an axial length of the coils of the first stator, and
  $Lc2$ is an axial length of the coils of the second stator.

According to this aspect, the axial length of the coils of the second stator is longer than that of the coils of the first stator, so that the magnetomotive force of the coils of the second stator can be made about the same as that of the coils of the first stator.

In a tenth aspect of the present invention, the following condition is satisfied.

$$Wc1 \cdot Lc1 \approx Wc2 \cdot Lc2.$$

According to this aspect, the sectional area of coils of the first stator is about the same as that of coils of the second stator, so that the magnetomotive force of the first stator can be made about the same as that of the second stator.

In an eleventh aspect of the present invention, the first and second stators have respective wide portions on air gap surfaces of tips of the teeth, and
  the motor satisfies the following conditions:

$$Rho1 \geq Rto1, Rho2 \geq Rto2, Rhi1 \leq Rti1, \text{ and } Rhi2 \leq Rti2,$$

where
  $Rho1$ is a radius of a circle connecting outermost peripheries, relative to the rotating shaft, of the wide portions of the first stator,
  $Rhi1$ is a radius of a circle connecting innermost peripheries, relative to the rotating shaft of the wide portions of the first stator,
  $Rho2$ is a radius of a circle connecting outermost peripheries, relative to the rotating shaft of the wide portions of the second stator, and
  $Rhi2$ is a radius of a circle connecting innermost peripheries, relative to the rotating shaft of the wide portions of the second stator.

According to this aspect, the condition is satisfied, so that magnetic flux can be transferred smoothly from the teeth to the wide portions of the first and second stators.

In a twelfth aspect of the present invention, the following conditions are satisfied:

$$RRo1<RRo2, \text{ and } RRi1<RRi2,$$

where
  $RRo1$ is a radius of a circle connecting outermost peripheries, relative to the rotating shaft, of the magnetic materials at portions facing the first stator of the rotor,
  $RRi1$ is a radius of a circle connecting innermost peripheries, relative to the rotating shaft, of the magnetic materials at portions facing the first stator of the rotor,
  $RRo2$ is a radius of a circle connecting outermost peripheries, relative to the rotating shaft, of the magnetic materials at portions facing the second stator of the rotor, and
  $RRi2$ is a radius of a circle connecting innermost peripheries, relative to the rotating shaft, of the magnetic materials at portions facing the second stator of the rotor.

According to this aspect, with the conditions satisfied, the tips of teeth of the first and second stators are covered by the magnetic materials of the rotor, so that the amount of leakage of magnetic flux extending from the first and second stators to the rotor can be made small.

In a thirteenth aspect of the present invention, the following conditions are satisfied:

$$RRo1 \approx Rto1, RRo2 \approx Rto2, RRi1 \approx Rti1, \text{ and } RRi2 \approx Rti2,$$

where
  $RRo1$ is a radius of a circle connecting outermost peripheries, relative to the rotating shaft, of the magnetic materials at portions facing the first stator of the rotor,
  $RRi1$ is a radius of a circle connecting innermost peripheries, relative to the rotating shaft, of the magnetic materials at portions facing the first stator of the rotor,
  $RRo2$ is a radius of a circle connecting outermost peripheries, relative to the rotating shaft, of the magnetic materials at portions facing the second stator of the rotor, and
  $RRi2$ is a radius of a circle connecting innermost peripheries, relative to the rotating shaft, of the magnetic materials at portions facing the second stator of the rotor.

According to this aspect, with the conditions satisfied, the tips of the teeth of the first and second stators face straight the magnetic materials of the rotor.

In a fourteenth aspect of the present invention, the following conditions are satisfied:

$$RRo \geq Rto1, RRo \geq Rto2, Rti1 \geq RRi, \text{ and } Rti2 \geq RRi,$$

where
  $RRo$ is a radius of a circle connecting outermost peripheries, relative to the rotating shaft, of the magnetic materials at portions facing the first and second stators of the rotor, and
  $RRi$ is a radius of a circle connecting innermost peripheries, relative to the rotating shaft, of the magnetic materials at portions facing the first and second stators of the rotor.

According to this aspect, with the conditions satisfied, it is possible to allow magnetic flux to be concentrated on the tips of the teeth of the first and second stators by the magnetic materials of the rotor, while securing a large sectional area of the permanent magnets.

In fifteenth aspect of the present invention, the rotor is provided with permanent magnets.

According to this aspect, use of the permanent magnets for the rotor allows magnetic flux densities of air gaps to be increased, so that a torque can be thus improved.

In a sixteenth aspect of the present invention, the rotor is provided with permanent magnets arranged in axially one layer, and magnetic materials magnetically separated per magnetic pole are provided on both axial end faces of the permanent magnets.

According to this aspect, since permanent magnets are provided in one layer axially, the quantity of magnets can be reduced, and since magnetic materials are provided on the surfaces of the permanent magnets, the rotor becomes resistant to demagnetization and the magnetic materials also contribute to a reduction in eddy-current loss. Furthermore, since magnetic fluxes of the magnets provided on the rotor form a magnetic circuit axially penetrating the first stator and the second stator through the magnets, magnetic fluxes passing through the first stator become the same as those passing through the second stator.

In a seventeenth aspect of the present invention, the back yoke of the first stator is provided with ribs protruding axially.

According to this aspect, the back yoke of the first stator which is thinner than the back yoke of the second stator is provided with ribs protruding axially, so that the strength of the back yoke of the first stator can be increased.

A compressor according to an eighteenth aspect of the present invention is equipped with the motor according to any one of the above aspects.

According to the above configuration, the compressor can be miniaturized.

As is apparent from the above, according to the first aspect of the present invention, in a motor with first and second stators facing each other through air gaps on both axial sides of a rotor fixed to a rotating shaft, a motor which can be miniaturized can be realized.

Furthermore, according to a motor of the second aspect, the radius $Ri1$ of a hole provided centering on an axis in a back yoke of the first stator is less than the radius $Ri2$ of a shaft hole which a rotating shaft passes through of a back yoke of the second stator, so that the radial dimension of the back yoke of the first stator can be longer than that of the back yoke of the second stator.

Furthermore, according to a motor of the third aspect, the outside radius Ro of a back yoke of the first stator is about the same as that of a back yoke of the second stator, and a condition that $$(Ro-Ri1)Ty1=(Ro-Ri2)Ty2$$

is satisfied, so that a sectional area along a plane including an axis of the back yoke of the first stator becomes the same as that of back yoke of the second stator.

Furthermore, according to a motor of the fourth aspect, magnetic flux passing through magnetic materials provided on the rotor forms a magnetic circuit axially penetrating the first stator and the second stator through the magnetic materials and therefore magnetic flux passing through the first stator becomes the same as that passing through the second stator, so that thrust force acting on the rotor is cancelled combined with the reluctance of the first stator being the same as that of the second stator.

Furthermore, according to a motor of the fifth aspect, a load is connected to the second stator side of the rotating shaft, so that the rotating shaft can be supported with stability by providing a bearing rotatably supporting the rotating shaft on the second stator side rather than the rotor side.

Furthermore, according to a motor of the sixth aspect, assuming that the radius of a circle connecting outermost peripheries, relative to the rotating shaft, of teeth of the first stator is $Rto1$, the radius of a circle connecting innermost peripheries, relative to the rotating shaft, of the teeth of the first stator is $Rti1$, the radius of a circle connecting outermost peripheries, relative to the rotating shaft, of teeth of the second stator is $Rto2$, and the radius of a circle connecting innermost peripheries, relative to the rotating shaft of the teeth of the second stator is $Rti2$, conditions that $$Rto1<Rto2 \text{ and } Rti1<Rti2$$

are satisfied, so that the teeth of the first stator are shifted as a whole to the radial inside more than the teeth of the second stator and therefore spaces on the inner periphery sides of the teeth of the first stator can be effectively used.

Furthermore, according to a motor of the seventh aspect, the radial length of teeth of the first stator shifted to the radial inside is longer than that of teeth of the second stator, so that the sectional area along a plane orthogonal to the rotating shaft of the first stator can be made about the same as that of the second stator.

Furthermore, according to a motor of the eighth aspect, the radial width of coils of the first stator is longer than that of coils of the second stator, so that the utilization density of a space on the first stator side increases.

Furthermore, according to a motor of the ninth aspect, the axial length of coils of the second stator is longer than that of coils of the first stator, so that the magnetomotive force of the coils of the second stator can be made about the same as that of the coils of the first stator.

Furthermore, according to a motor of the tenth aspect, the sectional area of coils of the first stator is about the same as that of coils of the second stator, so that the magnetomotive force of the first stator can be made about the same as that of the second stator.

Furthermore, according to a motor of the eleventh aspect, assuming that the radius of a circle connecting outermost peripheries, relative to the rotating shaft, of wide portions of the first stator is $Rho1$, the radius of a circle connecting innermost peripheries, relative to the rotating shaft, of the wide portions of the first stator is $Rhi1$, the radius of a circle connecting outermost peripheries, relative to the rotating shaft, of wide portions of the second stator is $Rho2$, and the radius of a circle connecting innermost peripheries, relative to the rotating shaft, of the wide portions of the second stator is $Rhi2$, conditions that $$Rho1 \geq Rto1, Rho2 \geq Rto2, Rhi1 \leq Rti1, \text{ and } Rhi2 \leq Rti2$$

are satisfied, so that magnetic flux can be transferred smoothly from teeth to the wide portions of the first and second stators.

Furthermore, according to a motor of the twelfth aspect, assuming that the radius of a circle connecting outermost peripheries, relative to the rotating shaft, of magnetic materials at portions facing the first stator of the rotor is $RRo1$, the radius of a circle connecting innermost peripheries, relative to the rotating shaft, of magnetic materials at portions facing the first stator of the rotor is $RRi1$, the radius of a circle connecting outermost peripheries, relative to the rotating shaft, of magnetic materials at portions facing the second stator of the rotor is $RRo2$, and the radius of a circle connecting innermost peripheries, relative to the rotating shaft, of magnetic materials at portions facing the second stator of the rotor is $RRi2$, conditions that $$RRo1<RRo2 \text{ and } RRi1<RRi2$$

are satisfied, so that the tips of teeth of the first and second stators are covered by the magnetic materials of the rotor, and thereby the amount of leakage of magnetic flux extending from the first and second stators to the rotor can be made small.

Furthermore, according to a motor of the thirteenth aspect, assuming that the radius of a circle connecting outermost peripheries, relative to the rotating shaft, of magnetic materials at portions facing the first stator of the rotor is RRo1, the radius of a circle connecting innermost peripheries, relative to the rotating shaft, of magnetic materials at portions facing the first stator of the rotor is RRi1, the radius of a circle connecting outermost peripheries, relative to the rotating shaft, of magnetic materials at portions facing the second stator of the rotor is RRo2, and the radius of a circle connecting innermost peripheries, relative to the rotating shaft, of magnetic materials at portions facing the second stator of the rotor is RRi2, conditions that RRo1≈Rto1, RRo2≈Rto2, RRi1≈Rti1, and RRi2≈Rti2 are satisfied, so that the tips of teeth of the first and second stators face straight the magnetic materials of the rotor.

Furthermore, according to a motor of the fourteenth aspect, assuming that the radius of a circle connecting outermost peripheries, relative to the rotating shaft, of magnetic materials at portions facing the first and second stators of the rotor is RRo, and the radius of a circle connecting innermost peripheries, relative to the rotating shaft, of magnetic materials at portions facing the first and second stators of the rotor is RRi, conditions that RRo≧Rto1, RRo≧Rto2, Rti1≧RRi, and Rti2≧RRi are satisfied, so that magnetic flux can be concentrated on tips of teeth of the first and second stators by the magnetic materials of the rotor, while allowing a large sectional area of permanent magnets.

Furthermore, according to a motor of the fifteenth aspect, the rotor is provided with permanent magnets, so that magnetic flux densities of the air gaps can be increased and a torque can be thus improved.

Furthermore, according to a motor of the sixteenth aspect, since permanent magnets are provided in one layer axially, the quantity of magnets can be reduced, and since magnetic materials are provided on the surfaces of the permanent magnets, the rotor becomes resistant to demagnetization and the magnetic materials also contribute to a reduction in eddy-current loss, and since magnetic flux of magnets provided on the rotor forms a magnetic circuit axially penetrating the first stator and the second stator through the magnets, magnetic flux passing through the first stator becomes the same as that passing through the second stator.

Furthermore, according to a motor of the seventeenth aspect, a back yoke of the first stator which is thinner than a back yoke of the second stator is provided with ribs protruding axially, so that the strength of the back yoke of the first stator can be increased.

Furthermore, a compressor of the eighteenth aspect of the present invention is equipped with any one of the motors to drive a compression mechanism, so that the compressor can be miniaturized.

DESCRIPTION OF EMBODIMENTS

Figure 1:
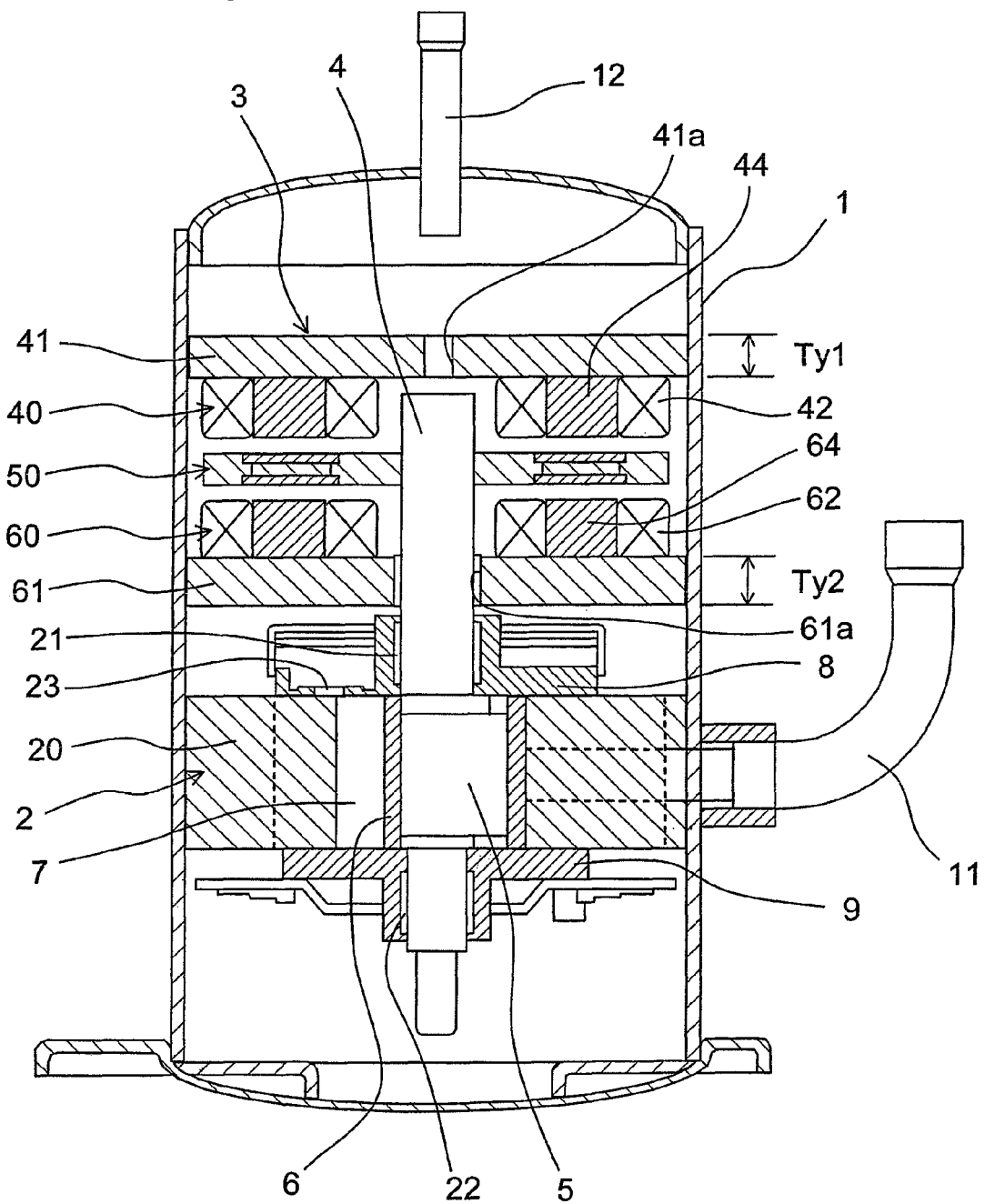
FIG. 1 is a cross-sectional view of a compressor using an axial gap motor according to a first embodiment of the present invention.

A motor and a compressor according to the present invention will be described in detail below with reference to embodiments shown in the drawings.

First Embodiment

FIG. 1 is a cross-sectional view of a compressor using an axial gap motor according to the first embodiment of the present invention. The compressor of the first embodiment is a high-pressure dome type with stators which are different from each other in inside diameter and back yoke thickness.

The compressor of the first embodiment has, as shown in FIG. 1, a closed container 1, a compression mechanism 2 located in the closed container 1, and an axial gap motor 3 which is located in the closed container and on the upper side of the compression mechanism 2 and drives the compression mechanism 2 through a rotating shaft 4. A suction pipe 11 is connected to the lower lateral side of the closed container 1, while a discharge pipe 12 is connected to the upper side of the closed container 1. Refrigerant gas supplied through the suction pipe 11 is guided to the suction side of the compression mechanism 2.

The axial gap motor 3 has a rotor 50 fixed around the rotating shaft 4, a first stator 40 located on the axial upper side of the rotor 50, and a second stator 60 located on the axial lower side of the rotor 50.

Figure 2:
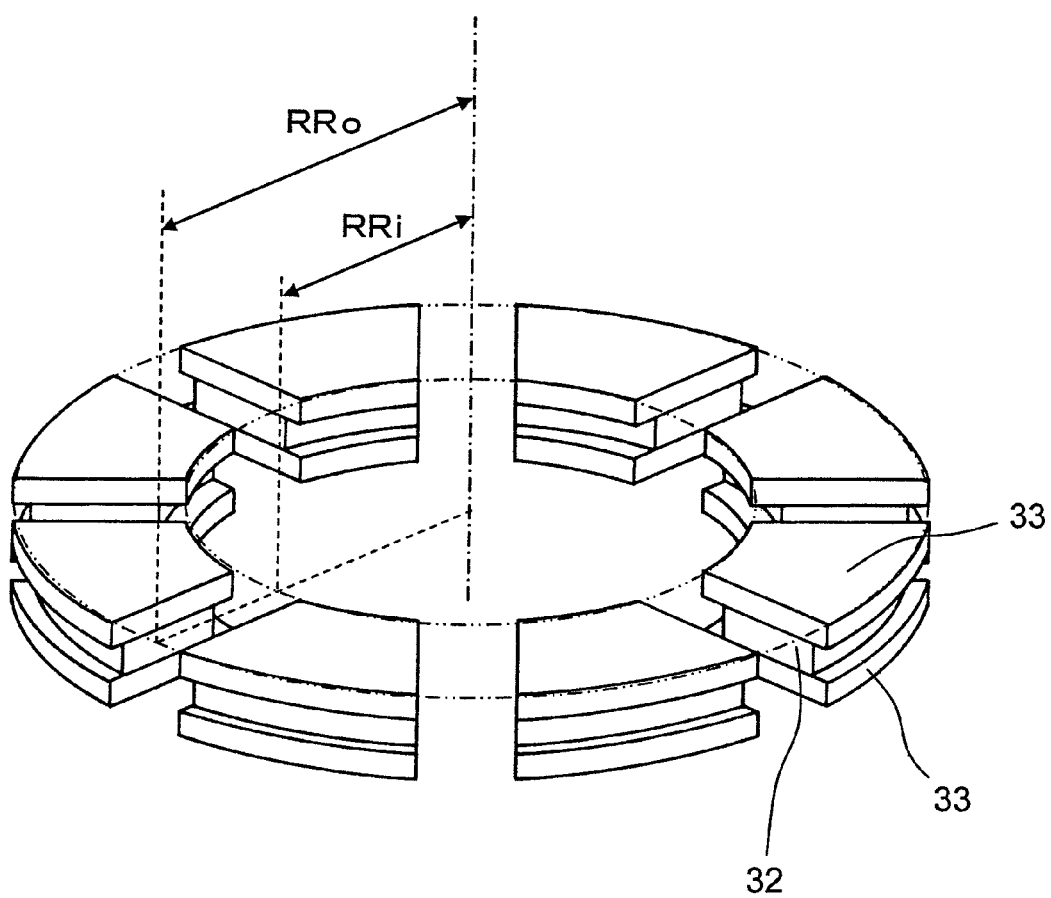
FIG. 2 is a perspective view of a main part of a rotor of the axial gap motor.

The rotor 50 is made, as shown in FIG. 2, in such a way that permanent magnets 32 are sandwiched between rotor cores 33 made of magnetic material (soft magnetic material such as iron) from both axial sides of the permanent magnets 32. The permanent magnets 32 having different magnetic poles are magnetically separated from each other including the rotor cores 33. In FIG. 2, RRo is the radius of a circle connecting outermost peripheries, relative to the rotating shaft 4, of the rotor cores 33, and RRi1 is the radius of a circle connecting innermost peripheries, relative to the rotating shaft 4, of the rotor cores 33. When the permanent magnets are exposed to the air gap, RRo is the radius of a circle connecting outermost peripheries, relative to the rotating shaft 4 (shown in FIG. 1), of the permanent magnates, and RRi1 is the radius of a circle connecting innermost peripheries, relative to the rotating shaft 4, of the permanent magnets.

Figure 3:
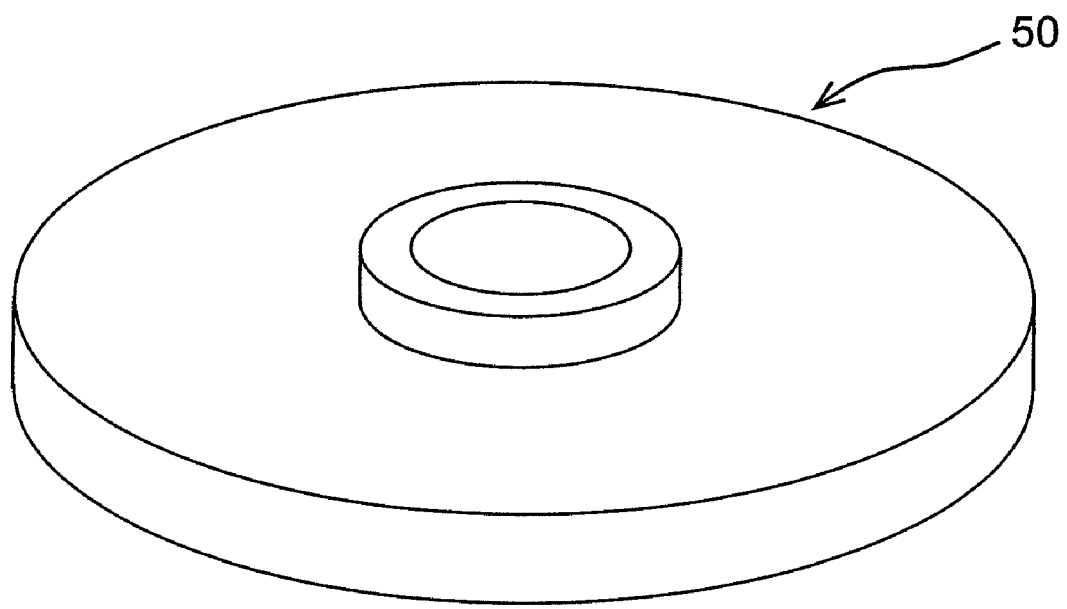
FIG. 3 is a perspective view of a molded rotor.

The permanent magnets 32 and the rotor cores 33 shown in FIG. 2 are molded in one piece as shown in FIG. 3 in order to hold the whole of the rotor 50. FIG. 3 shows an example molded entirely, but the rotor cores may be exposed from the resin to reduce the lengths of the air gaps. Since the permanent magnets 32 are used for the rotor 50, the magnetic flux densities of the air gaps can be increased and the torque can be thus improved. Furthermore, since the permanent magnets are provided in one layer axially, the quantity of magnets can be reduced. In addition, since the iron cores (rotor cores) are provided on the surfaces of the magnets, the rotor is resistant to demagnetization. If the rotor cores are dust iron cores, they also contribute to a reduction in eddy-current loss.

As shown in FIG. 1, the first stator 40 has a back yoke 41 made of a magnetic material shaped like a disk having a hole 41a in the center, and coils 42 wound around teeth 44 which are installed in a standing manner along a circumference on the back yoke 41. Furthermore, the second stator 60 has a back yoke 61 made of a magnetic material shaped like a disk having a shaft hole 61a in the center, and coils 62 wound around teeth 64 which are installed in a standing manner along a circumference on the back yoke 61.

Figure 4:
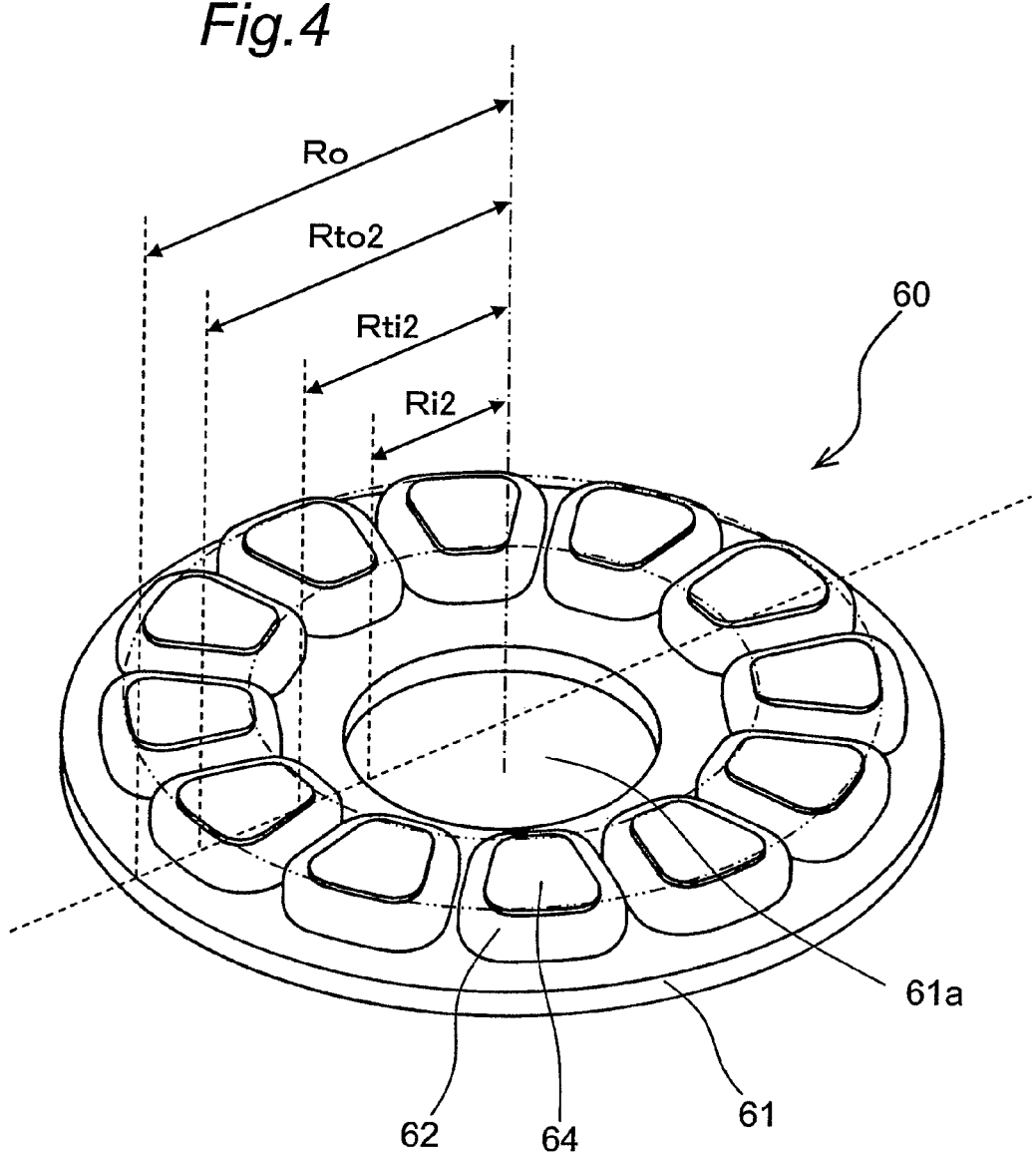
FIG. 4 is a perspective view of the second stator of the axial gap motor.

FIG. 4 is a perspective view of the second stator 60. The first stator 40 has a configuration similar to the second stator 60 (upside down) except that the diameter of the center hole is less than that of the second stator and the thickness of the back yoke is less than that of the second stator.

As shown in FIG. 4, the second stator 60 has axial coils directly wound around the teeth 64 extending axially. The teeth 64 are magnetically connected with each other by the back yoke 61. The coils 62 are connected, for example, in a star connection, to which an electric current is supplied from an inverter (ditto for the first stator 40).

Coils 42 are wound around teeth in positions facing the rotor 50 of the first stator 40 so as to generate poles opposite to those generated by coils 62 wound around teeth in positions facing the rotor 50 of the second stator 50. In other words, coils wound around teeth in the same direction when viewed from one of axial directions are provided.

In FIG. 4, Ro is the outside radius of the back yoke 61, Rto2 is the radius of a circle connecting outermost peripheries, relative to the rotating shaft 4, of the teeth 64, Rti2 is the radius of a circle connecting innermost peripheries, relative to the rotating shaft 4, of the teeth 64, and Ri2 is the inside radius of the back yoke 61.

In the axial gap motor 3, magnetic fluxes on both sides of the permanent magnets 32 of the rotor 50 link with the first stator 40 and the second stator 60, respectively, thereby increasing the torque.

Furthermore, the compression mechanism 2 has, as shown in FIG. 1, a cylinder-like main body 20, and a top end plate 8 and a bottom end plate 9 which are fitted to the upper open end and the lower open end of the main body 20, respectively. The rotating shaft 4 penetrates the top end plate 8 and the bottom end plate 9 and is inserted in the main body 20. The rotating shaft 4 is rotatably supported by a bearing 21 provided on the top end plate 8 of the compression mechanism 2 and a bearing 22 provided on the bottom end plate 9 of the compression mechanism 2. A crank pin 5 is provided on the rotating shaft 4 in the main body 20, and compression is conducted with a compression chamber 7 formed between a piston 6 which is engaged with and driven by the crank pin 5 and a cylinder corresponding to the piston 6. The piston 6 revolves in an eccentric state to change the capacity of the compression chamber 7.

In the compressor configured as above, when the compression mechanism 2 is driven by rotating the axial gap motor 3, a refrigerant gas is supplied to the compression mechanism 2 through the suction pipe 11 and compressed by the compression mechanism 2. High-pressure refrigerant gas compressed by the compression mechanism 2 is discharged in the closed container 1 from a discharge port 23 of the compression mechanism 2 and conveyed to the upper space of the axial gap motor 3 through grooves (not shown) provided around the rotating shaft 4, holes (not shown) penetrating the insides of the first stator 40, rotor 50, and second stator 60, spaces between the outer peripheries of the stator 40, rotor 50, and stator 60 and the inner surface of the closed container 1, etc., and is then discharged to the outside of the closed container 1 through the discharge pipe 12.

Next, the detailed structure of the axial gap motor 3 will be described.

As shown in FIG. 1, the bearing 21 is not provided only on the second stator 60 side rather than on the rotor 50 side, with an open-sided structure. Specifically, the bearing 21 is provided inside a portion having the discharge port 23 of the upper part of the compression mechanism 2, and may also be provided inside the second stator. Furthermore, the compression mechanism 2 is provided on the side opposite to the rotor 50 of the bearing 21.

The radius of the hole 41a of the back yoke 41 of the first stator 40 is less than the radius of the shaft hole 61a of the back yoke 61 of the second stator 60. This is because it is not necessary for the rotating shaft 4 to extend to the first stator 40 and the shaft does not penetrate the first stator 40. Specifically, it is necessary for the shaft hole 61a of the second stator 60 to be larger than the rotating shaft 4 in diameter, but no shaft hole is necessary for the first stator 40. Furthermore, the tip of the rotating shaft 4 can be less than other portions in diameter, so that even if the shaft penetrates the first stator, the tip can be certainly less than the shaft hole of the second stator in diameter. However, in the case of a compressor, the first stator needs any refrigerant passage, thus needing any through-hole.

Figure 5:
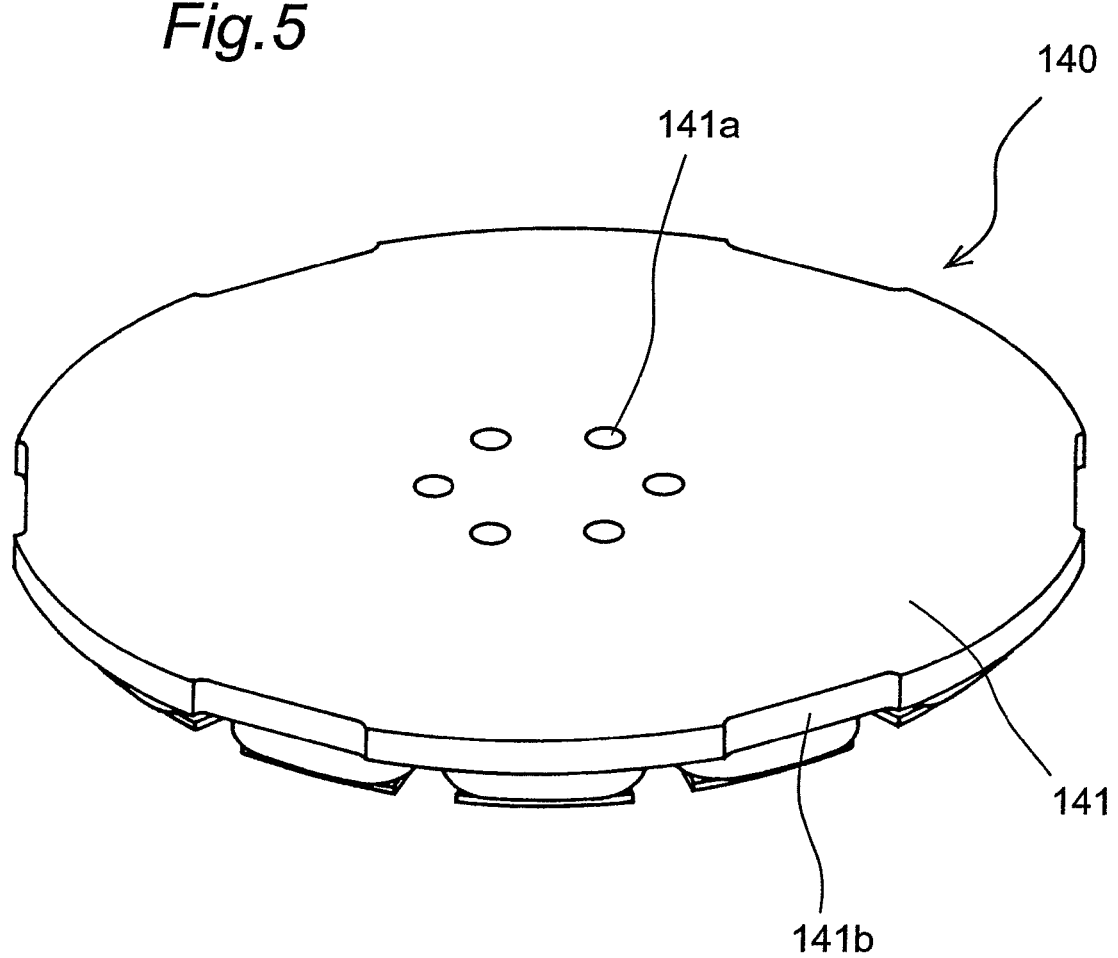
FIG. 5 is a perspective view of a variation of the first stator of the axial gap motor.

For example, as shown in FIG. 5 which is a perspective view of a first stator 140 having through-holes as refrigerant passages, there may be two or more small holes 141a around the axis of a back yoke 141. In addition, refrigerant passages may be provided also around the axis of a second stator. Furthermore, when the outer periphery of the back yoke 141 is fixed to the inside of a compression container by shrink fitting, welding, or the like, oil-return passages 141b are provided on the outer periphery. Theses refrigerant and oil passages may be designed optionally. Since these passages increase the reluctance, the following should be considered.

Figure 6:
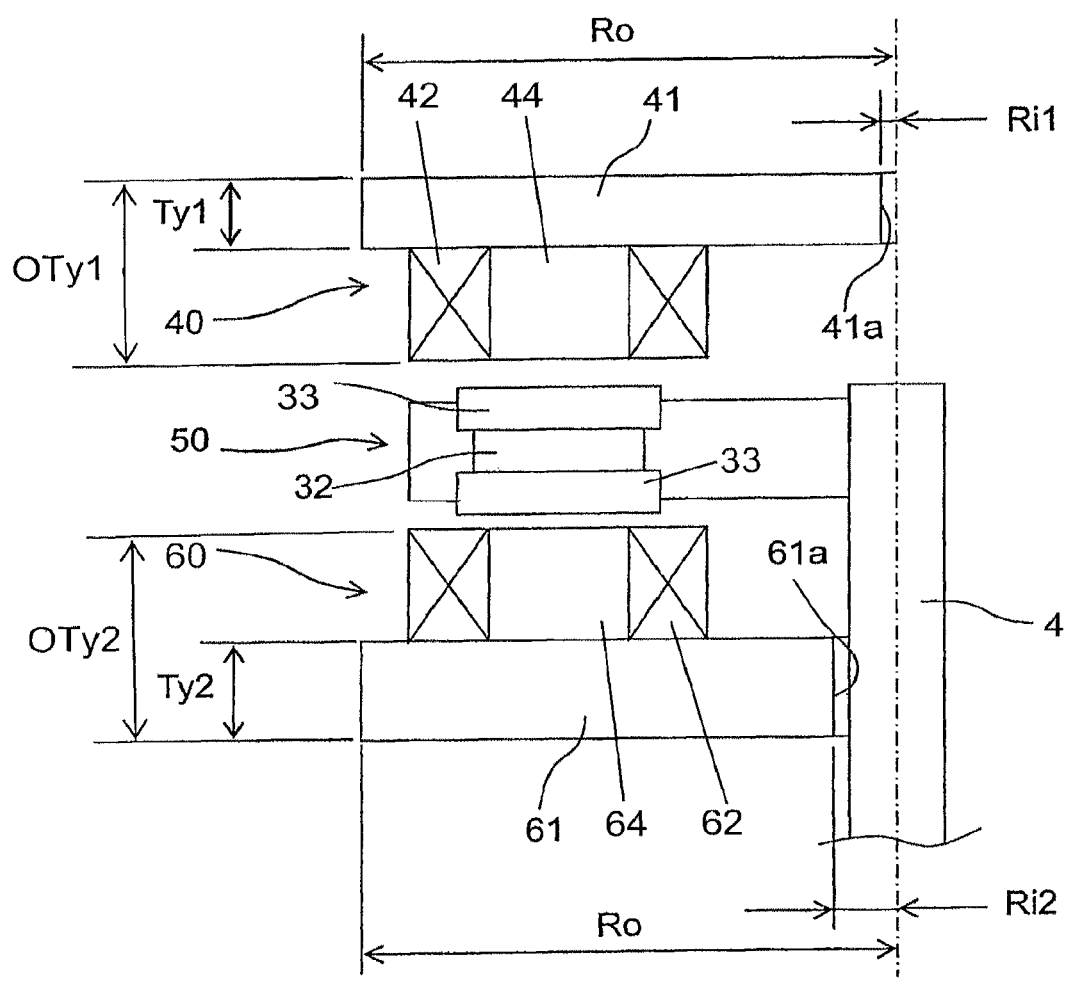
FIG. 6 is a schematic diagram of a longitudinal section of a main part of the axial gap motor.

The hole of the first stator is small, meaning that the sectional area along a plane including the axis of the back yoke is large. FIG. 6 is a schematic diagram of a longitudinal section of the main part of the axial gap motor. Even if the thickness Ty1 of the back yoke 41 of the first stator 40 is made less than the thickness Ty2 of the back yoke 61 of the second stator 60 as shown in FIG. 6, a certain magnetic path area can be secured because the back yoke 41 of the first stator 40 has an enough width. Thus, the reluctance of the first stator 40 can be made substantially equal to that of the second stator 60, so that the axial dimension of the motor can be reduced in a structure with the first stator 40 and the second stator 60 facing each other on both axial sides of the rotor 50. As seen in FIGS. 1 and 6, the teeth 44 and 64 having the coils 42 and 62 thereon have equal axial thicknesses. Thus, due to the thicknesses Ty1 and Ty2 of the back yoke plates 41 and 61, the second stator 60 has an overall axial thickness OTy2 (a combined thickness of the teeth 64 and the back yoke plate 61) that is larger than an overall axial thicknesses OTy1 of the first stator 40 (a combined thickness of the teeth 44 and the back yoke plate 41).

When the outside radius of the back yokes 41 and 61 is Ro, the radius of the hole 41a of the back yoke 41 is Ri1, and the radius of the shaft hole 61a of the back yoke 61 is Ri2, if $$(Ro-Ri1)Ty1=(Ro-Ri2)Ty2$$

is satisfied, the sectional area of the magnetic path of the first stator 40 is the same as that of the second stator 60.

Furthermore, when the axial gap motor has a refrigerant passage, Ro, Ri1, and Ri2 to make the area of a cutting plane orthogonal to the axis of the back yoke 41 to be equal to that of the back yoke 61 may be used as equivalent radiuses.

Furthermore, in a rotor structure having no back yoke to short-circuit magnetic poles of magnets, like the rotor 50 in which the permanent magnet 32 is sandwiched between the rotor cores 33 from both axial sides, the axial thickness of a rotor can be reduced. In other words, in the rotor, magnetic flux axially penetrates it.

When the axial gap motor is mounted on the compressor, the back yoke of the second stator needs sufficient strength because discharged gas from the compression mechanism directly acts on the back yoke of the second stator, but the back yoke of the first stator does not need much strength because the discharged gas acts on the back yoke of the first stator after the discharged gas has passed through the air gap, etc of the motor and the pulsation has been sufficiently attenuated. In other words, it is desired also in a structural point of view that the thickness of the back yoke of the first stator is made less than that of the second stator.

Figure 7:
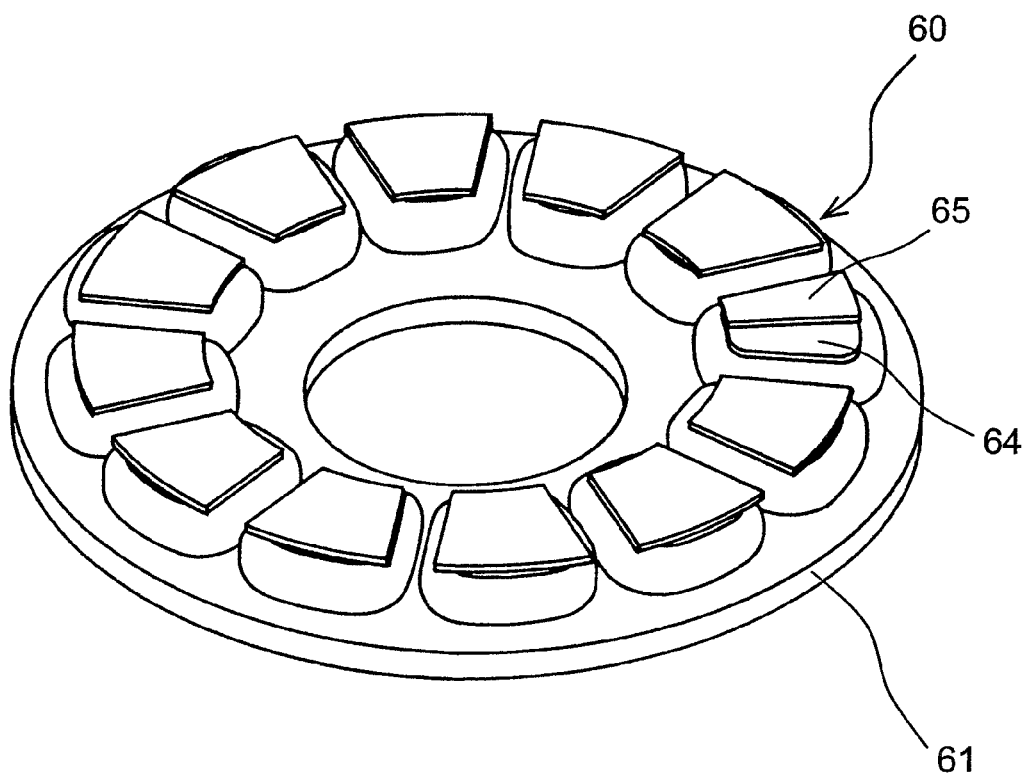
FIG. 7 is a perspective view of a stator with wide portions on the tips of teeth.

When the second stator 60 has wide portions 65 on the tips of the teeth 64 as shown in FIG. 7, the outside diameter and inside diameter of the wide portions 65 are read in a different way as the outside diameter and inside diameter of the teeth 64. The wide portions 65 on the tips of the teeth serve to allow the magnetic flux of the rotor 60 to more link with the second stator (ditto for the first stator). In FIG. 7, part of the wide portions 65 is cut so that part of the teeth 64 can be seen.

Second Embodiment

Figure 8:
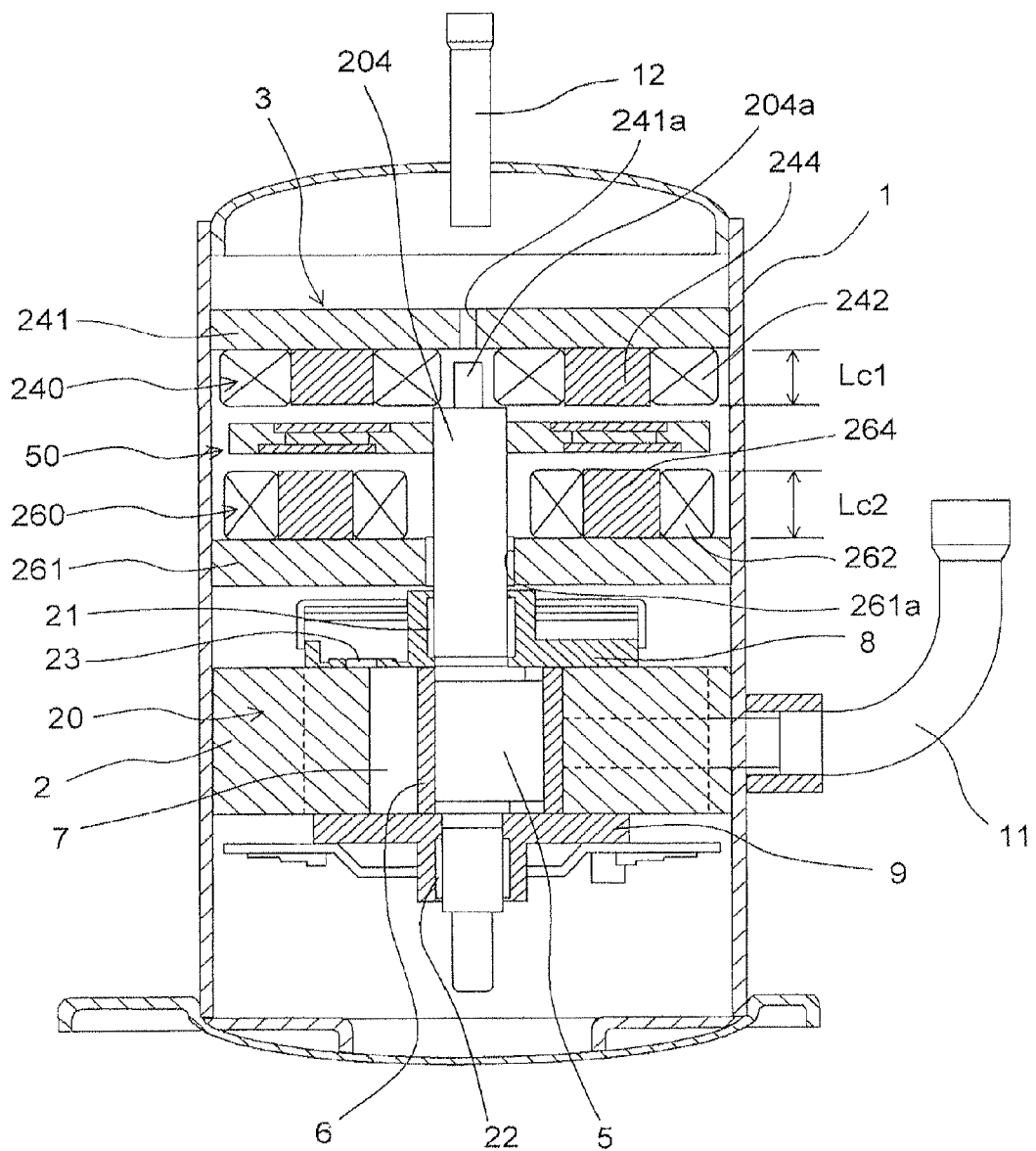
FIG. 8 is a cross-sectional view of a compressor using an axial gap motor according to a second embodiment of the present invention.

FIG. 8 is a cross-sectional view of a compressor using an axial gap motor 303 according to the second embodiment of the present invention. The compressor of the second embodiment is a high-pressure dome type in which stators are different from each other in inside diameter and back yokes of the stators are different from each other in thickness. The relations between the inside diameters, outside diameters, and thicknesses of the back yokes are the same as those of the first embodiment. The same configuration as the compressor of the first embodiment is shown with the same reference numbers.

As shown in FIG. 8, a first stator 240 has a back yoke 241 made of magnetic material shaped like a disk having a hole 241a in the center, and coils 242 wound around teeth 244 which are installed in a standing manner along a circumference on the back yoke 241. Furthermore, a second stator 260 has a back yoke 261 made of magnetic material shaped like a disk having a shaft hole 261a in the center, and coils 262 wound around teeth 264 which are installed in a standing manner along a circumference on the back yoke 261.

In addition, a thick rotating shaft 204 (needing at least a thickness for holding the rotor 50 to the bearing 21) passes through the shaft hole 261a of the second stator 260, so that a space capable of accommodating the coils 262 and teeth 264 of the second stator 260 is limited. On the other hand, in FIG. 8, a space capable of accommodating the coils 242 and teeth 244 of the first stator 240 is limited only by an end portion 204a of the rotating shaft 204 which is thinner than other portions of it. In other words, the teeth 244 of the first stator 240 can be provided inside more than the teeth of the second stator 260, and the radial width of the coils 242 of the first stator 240 can be made larger than that of the second stator 260. If the rotating shaft 204 does not protrude from the rotor 50 to the first stator, the radial width of the coils 242 can be made still larger.

Figure 9A:
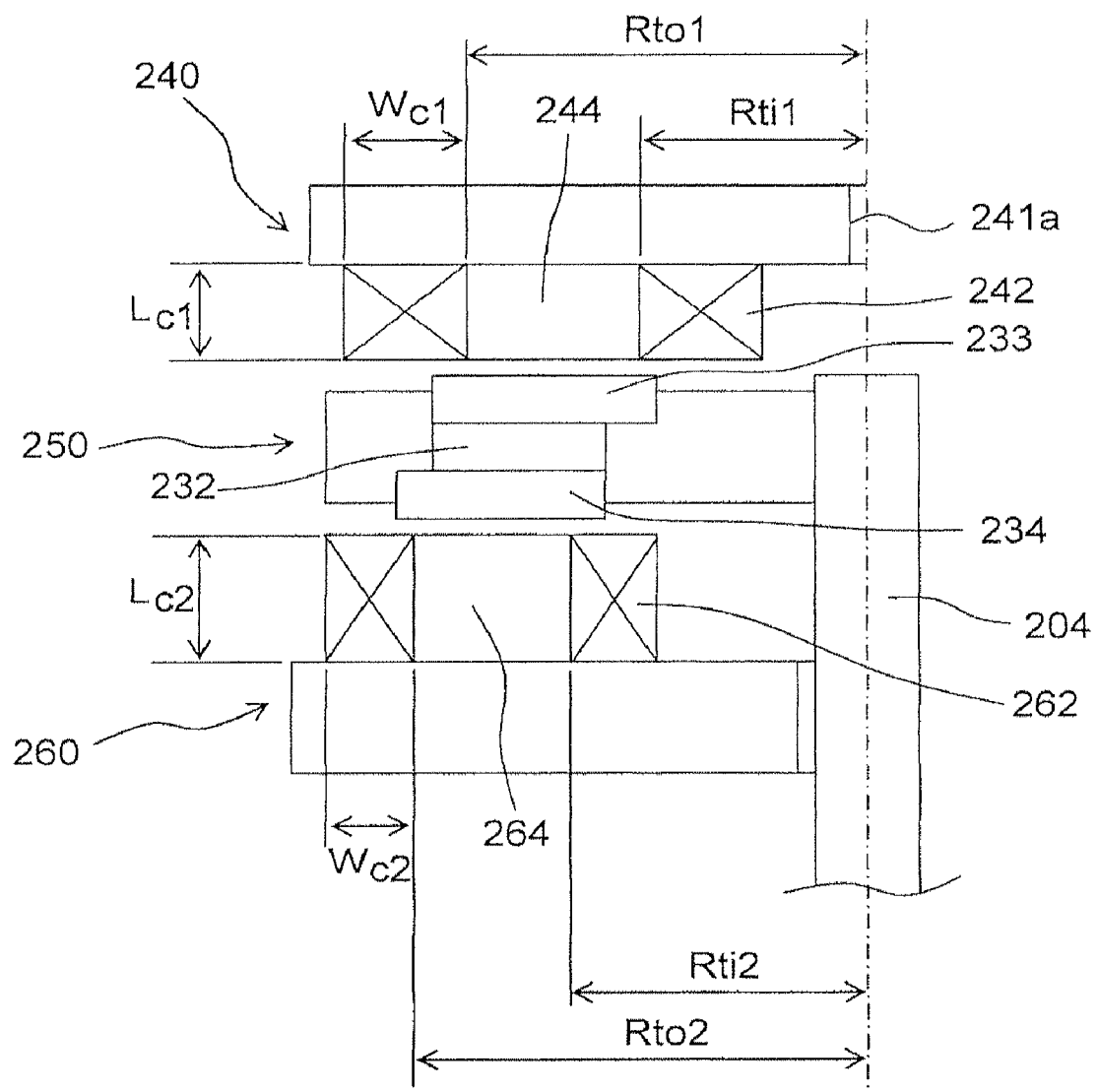
FIG. 9A is a schematic diagram of a longitudinal section of a main part of the axial gap motor.

FIG. 9A is a schematic diagram of a longitudinal section of the main part of the axial gap motor 303.

The first stator 240 and the second stator 260 are similar to the second stator 60 shown in FIG. 4, and the first stator 240 is different from the second stator 260 in positions of teeth, forms of coils, etc. As shown in FIG. 9A, assuming that:

the radius of a circle connecting outermost peripheries, relative to the rotating shaft 204, of the teeth 244 of the upper side first stator 240 is Rto1, the radius of a circle connecting innermost peripheries, relative to the rotating shaft 204, of the teeth 244 of the upper side first stator 240 is Rti1, the radius of a circle connecting outermost peripheries, relative to the rotating shaft 204, of the teeth 264 of the lower side second stator 260 is Rto2, and the radius of a circle connecting innermost peripheries, relative to the rotating shaft 204, of the teeth 264 of the lower side second stator 260 is Rti2, $$Rto1<Rto2 \text{ and } Rti1<Rti2$$

are satisfied.

In other words, the coils 242 of the first stator 240 can be installed to the inner radius portion, so that the distance between the inner periphery of the compression container 1 and the teeth 244 is increased (Rto1<Rto2) and the inside diameter of the teeth 244 is reduced accordingly (Rti1<Rti2).

Since the inside diameter of the teeth 244 of the first stator 240 is reduced, the sectional area of the teeth 244 may be reduced. For this reason, if $$(Rto1-Rti1)>(Rto2-Rti2)$$

is satisfied, the sectional area of the teeth of the first stator can be made substantially equal to the sectional area of the teeth of the second stator.

In addition, when the coil width of the first stator 240 is Wc1 and the coil width of the second stator is Wc2, if $$Wc1>Wc2$$

is satisfied, the utilization density of a space on the first stator 240 side increases.

At that time, as shown in FIG. 9A, the sectional area of the coils 242 of the first stator 240 becomes larger than that of the second stator 2560. If the height of the coils 242 is adjusted so that the sectional area of the coils 242 of the first stator 240 becomes equal to that of the second stator 260, the magneto-motive force of the first stator 240 preferably becomes equal to that of the second stator 260. Specifically, thrust force is more cancelled. In a numeric form, assuming that the axial length of the coils 242 of the first stator 240 is Lc1 and the axial length of the coils 262 of the second stator 260 is Lc2, $$Lc1<Lc2$$

satisfied. For this reason, the axial length of the first stator is more reduced.

In addition, when $$Wc1 \cdot Lc1 = Wc2 \cdot Lc2$$

is satisfied, the sectional area of the first stator 240 becomes equal to that of the second stator 260.

At that time, the diameter of a portion facing the rotor 250 of the first stator 240 is different from that of the second stator 260. Thus, there is a case that the area at portions facing the first stator 240 and the second stator 260 of the rotor 250 is reduced. As means for solving this problem, the following methods, for example, are considered.

First, there is a method of matching the rotor cores 233 and 234 made of magnetic material having surfaces facing the air gaps of the rotor 250 to the teeth 244 and 264 (or wide portions) of the first and second stators 240 and 260. This method can be realized in the form that the rotor cores 233 and 234 are provided on both sides of the permanent magnets 232. For example, as shown in FIG. 9A, the diameter of the rotor cores 233 on the top end face of the rotor 250 and the diameter of the rotor cores 234 on the bottom face of the rotor 250 are shifted in agreement with the diameter of the teeth 244 of the first stator 240 and the diameter of the teeth 264 of the second stator 260, respectively.

Figure 9B:
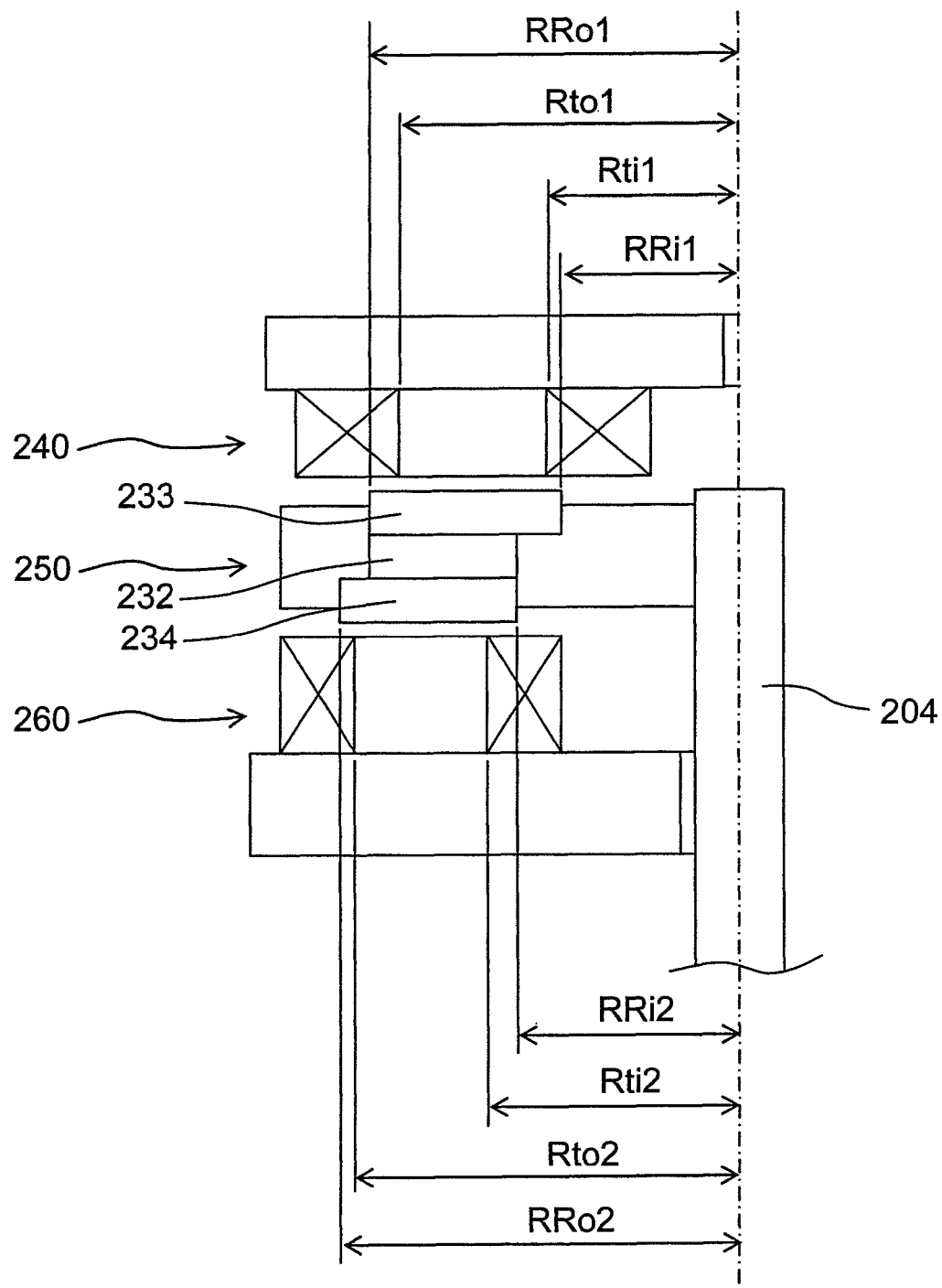
FIG. 9B is a schematic diagram of a longitudinal section of the main part of the axial gap motor.

Specifically, as shown in FIG. 9B, assuming that:
the radius of a circle connecting outermost peripheries, relative to the rotating shaft 204, of the rotor cores 233 (made of soft magnetic material such as iron) at portions facing the first stator 240 of the rotor 250 is RRo1,
the radius of a circle connecting innermost peripheries, relative to the rotating shaft 204, of the rotor cores 233 (made of soft magnetic material such as iron) at portions facing the first stator 240 of the rotor 250 is RRi1,
the radius of a circle connecting outermost peripheries, relative to the rotating shaft 204, of the rotor cores 234 (made of soft magnetic material such as iron) at portions facing the second stator 260 of the rotor 250 is RRo2, and
the radius of a circle connecting innermost peripheries, relative to the rotating shaft 204, of the rotor cores 234 (made of soft magnetic material such as iron) at portions facing the second stator 260 of the rotor 250 is RRi2, $$RRo1 < RRo2 \text{ and } RRi1 < RRi2$$

are satisfied.

In FIG. 9B, RRo1 is slightly larger than Rto1, RRo2 is slightly larger than Rto2, RRi1 is slightly less than Rti1, and RRi2 is slightly less than Rti2. In other words, the rotor cores 233 and 234 of the rotor 250 are designed to cover the tips of the teeth 244 and 264 of the first and second stators 240 and 260.

Figure 10A:
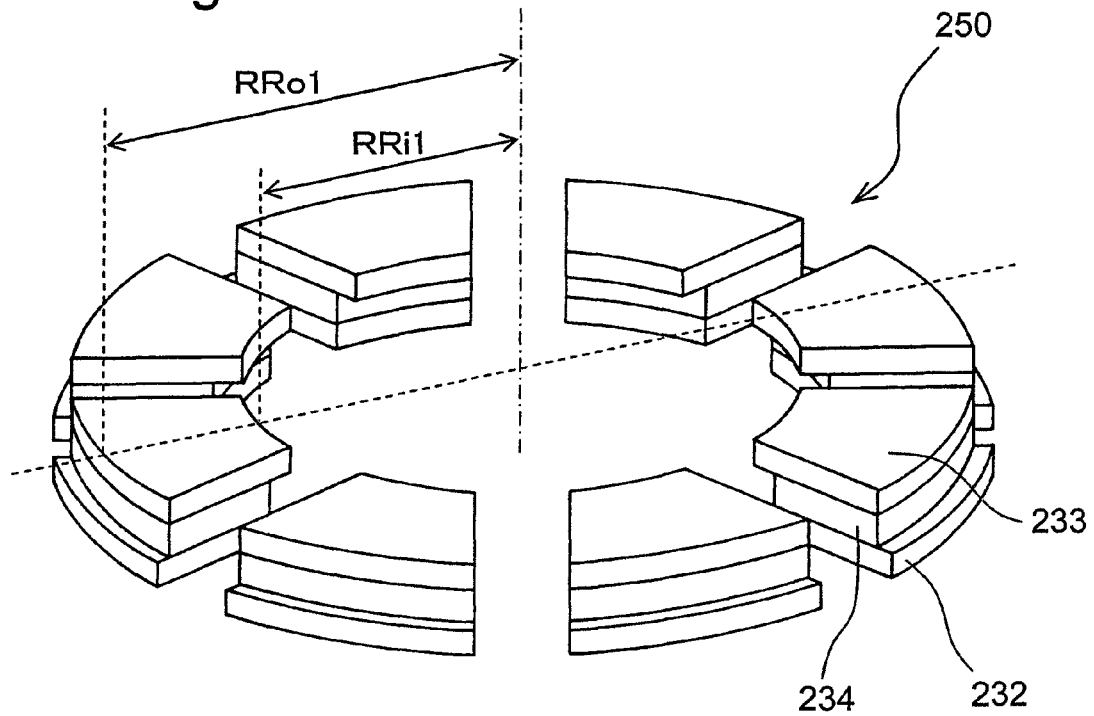
FIG. 10A is a perspective view of a rotor turned upside down seen obliquely from above.
Figure 10B:
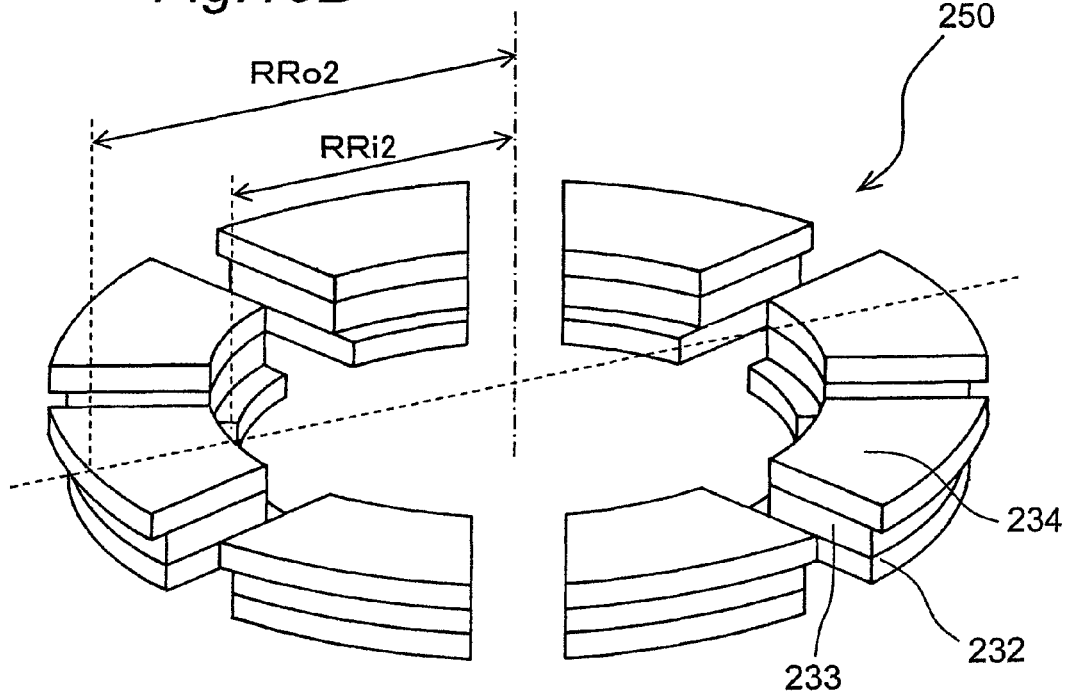
FIG. 10B is a perspective view of the rotor seen obliquely from above.

FIG. 10A is a perspective view of the rotor 250 seen obliquely from above, and FIG. 10B is a perspective view of the rotor 250 turned upside down seen obliquely from above. In FIGS. 10A and 10B, a holding mold, etc are omitted.

In FIGS. 10A and 10B, when the peripheral portions of the rotor cores 233 and 234 which are adjacent to each other on the top and bottom of the permanent magnet 232 are parallel, the open angle of the upper rotor cores 233 is different from that of the lower rotor cores 234 which are adjacent to the upper rotor cores 233, so that a so-called skew effect can be obtained between the first stator 240 and the second stator 260, and a cogging torque can be reduced.

Figure 11:
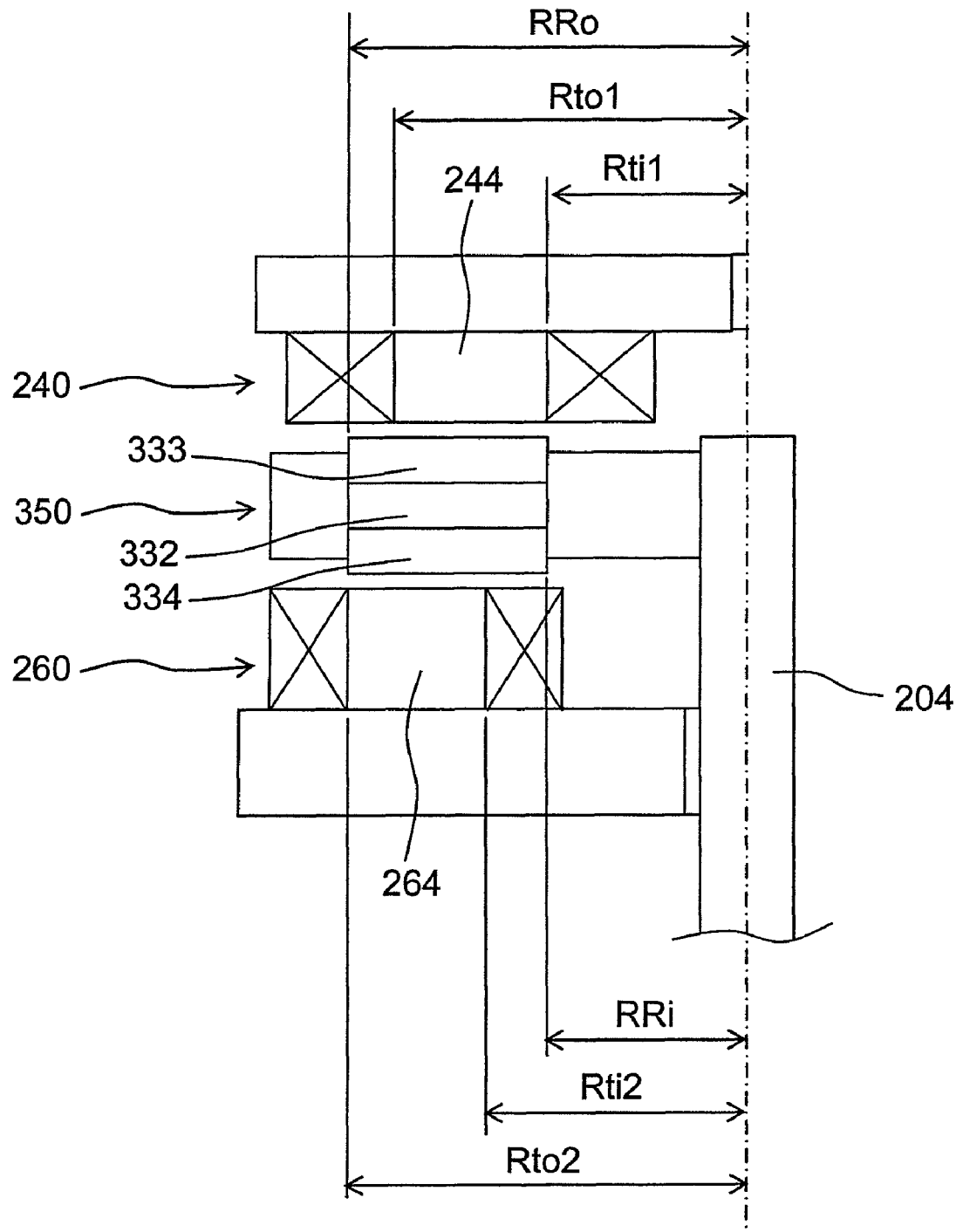
FIG. 11 is a schematic diagram of a longitudinal section of another example of the main part of the axial gap motor.

As shown in FIG. 11, on both ends of permanent magnets 332 of a rotor 350, rotor cores 333 and 334 made of magnetic material having about the same sectional form as that of the permanent magnets 332 may be provided. In this case, the teeth 244 and 264 of the first and second stators 240 and 260 are also included between the outside diameter and the inside diameter of the rotor cores 333 and 334. Specifically, assuming that:
the radius of a circle connecting outermost peripheries, relative to the rotating shaft 204, of the rotor cores 333 and 334 (made of soft magnetic material such as iron) at portions facing the first and second stators 240 and 260 of the rotor 350 is RRo, and
the radius of a circle connecting innermost peripheries, relative to the rotating shaft 204, of the rotor cores 333 and 334 (made of soft magnetic material such as iron) at portions facing the first and second stators 240 and 260 of the rotor 350 is RRi, the following relations hold.

$$RRo \geq Rto1, RRo \geq Rto2, Rti1 \geq RRi, \text{ and } Rti2 \geq RRi$$

This configuration, while allowing a large sectional area of the permanent magnets 332, allows magnetic flux to be concentrated on the tips of the teeth 244 and 264 by the rotor cores 333 and 334.

Figure 12:
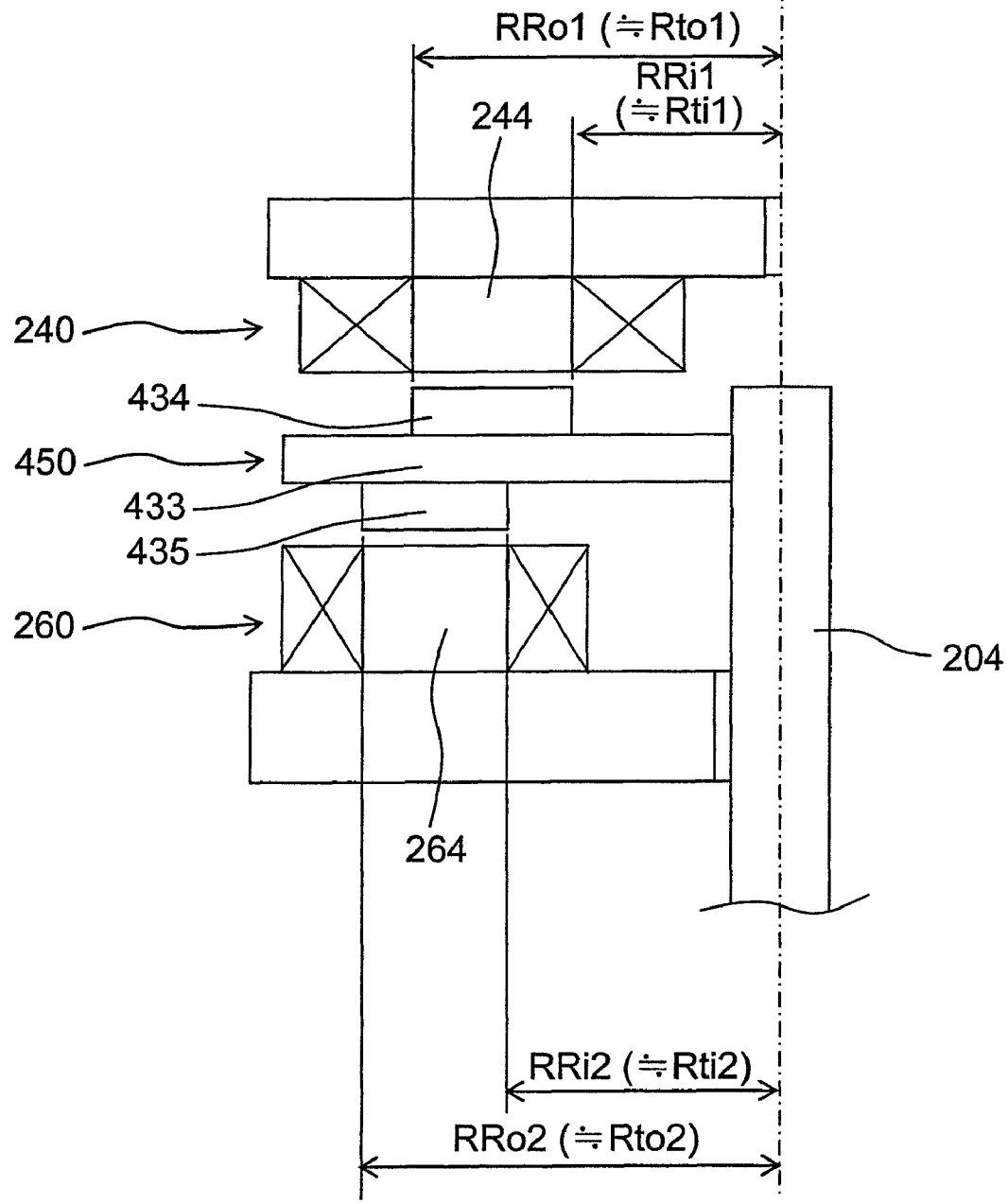
FIG. 12 is a schematic diagram of a longitudinal section of another example of the main part of the axial gap motor.

Furthermore, as shown in FIG. 12, permanent magnets 434 and 435 may be provided on both surfaces of a back yoke 433 of a rotor 450 so as to be exposed to the air gaps. However, the back yoke 433 short-circuits the opposite magnetic pole surfaces of the magnets facing each other axially rather than short-circuits the magnet poles of the magnets adjacent to each other circumferentially, and therefore does not need a much thickness.

In FIG. 12, the outside diameter and inside diameter of the tips of the teeth 244 are matched to the outside diameter and inside diameter of the permanent magnets 434, and the outside diameter and inside diameter of the tips of the teeth 264 are matched to the outside diameter and inside diameter of the permanent magnets 435. Specifically, assuming that:
the radius of a circle connecting outermost peripheries, relative to the rotating shaft 204, of the permanent magnets 434 (including both soft magnetic materials and hard magnetic materials) at portions facing the first stator 240 of the rotor 450 is RRo1,
the radius of a circle connecting innermost peripheries, relative to the rotating shaft 204, of the permanent magnets 434 (including both soft magnetic materials and hard magnetic materials) at portions facing the first stator 240 of the rotor 450 is RRi1,
the radius of a circle connecting outermost peripheries, relative to the rotating shaft 204, of the permanent magnets 435 (including both soft magnetic materials and hard magnetic materials) at portions facing the second stator 260 of the rotor 450 is RRo2, and
the radius of a circle connecting innermost peripheries, relative to the rotating shaft 204, of the permanent magnets 435 (including both soft magnetic materials and hard magnetic materials) at portions facing the second stator 260 of the rotor 450 is RRi2, $$RRo1 \approx Rto1, RRo2 \approx Rto2, RRi1 \approx Rti1, \text{ and } RRi2 \approx Rti2$$

are satisfied.

Furthermore, as described later, when wide portions are provided on the tips of teeth, the outside diameter and inside diameter of the teeth are read in a different way as the outside diameter and inside diameter of the wide portions.

Second, there is a method of providing wide portions on the tips of teeth to widen the tips of teeth so as to face the magnetic materials of a rotor.

Figure 13:
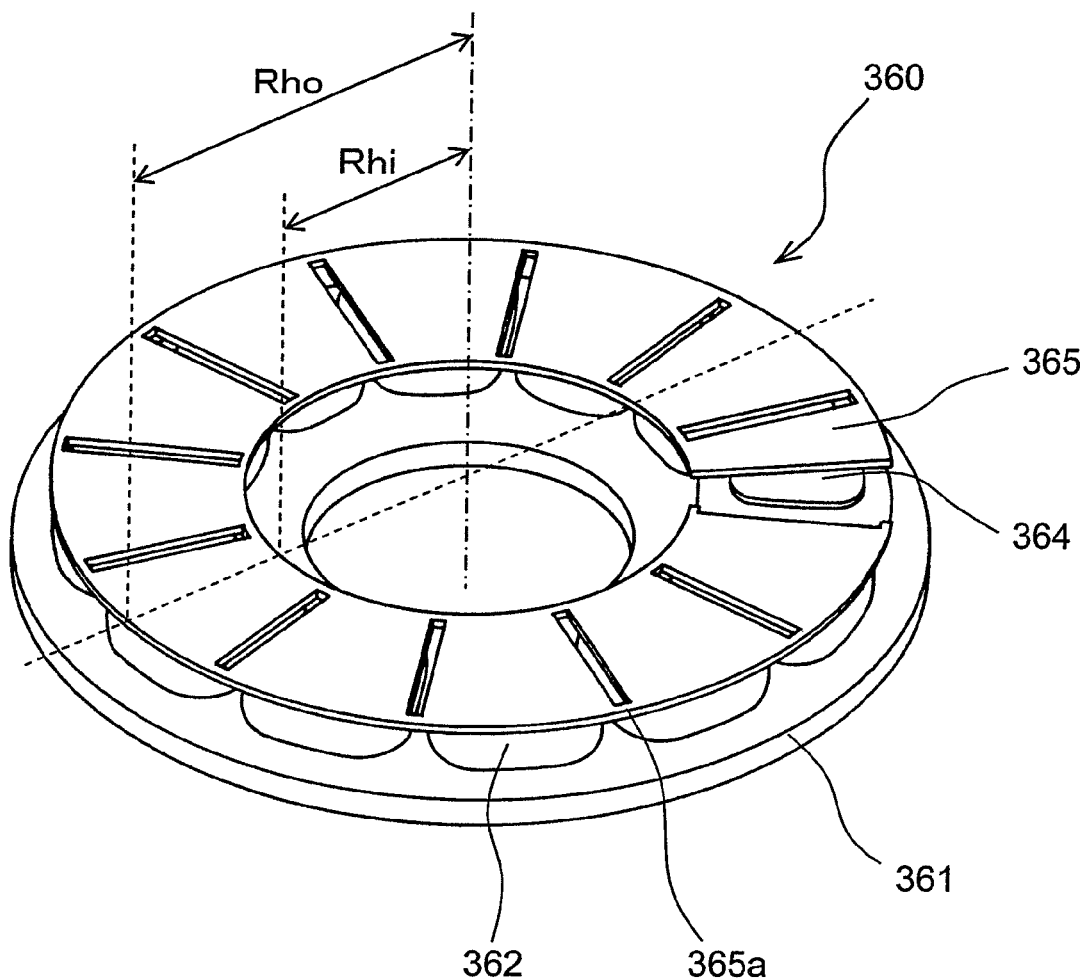
FIG. 13 is a perspective view of a stator with wide portions used for first and second stators.

FIG. 13 shows the structure of a stator 360 as a variation of the first and second stators 240 and 260, in which teeth 364 are installed in a standing manner along a circumference on a back yoke 361 and a coil 362 is wound around each of the teeth 364. The wide portions 365 of the tips of the teeth 364 are connected and integrated by thin portions 365a on the inner peripheries and the outer peripheries. The radius of the outsides of the wide portions 365 is Rho and the radius of the insides of them is Rhi. Rho and Rhi may be defined except the thin portions 365a. In either case, the thin portions 365a are sufficiently thin to such an extent that magnetic flux is not easily saturated and thus not short-circuited, so that there is no big difference between both definitions.

Figure 14:
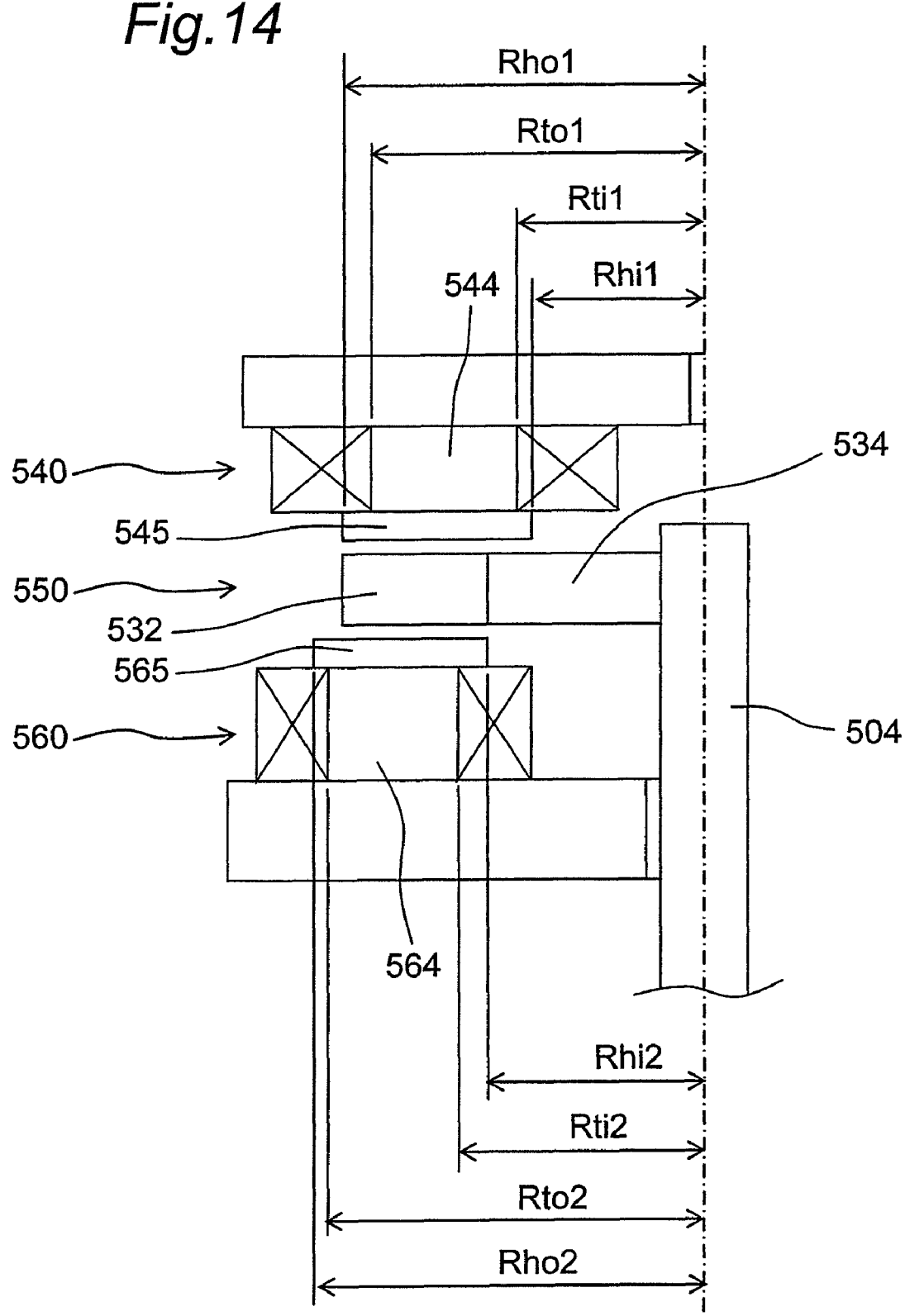
FIG. 14 is a schematic diagram of a longitudinal section of the main part of another variation of the axial gap motor.

FIG. 14 is a schematic diagram of a longitudinal section of the main part of another variation of the axial gap motor, in which both ends of permanent magnets 532 directly face air gaps. The permanent magnets 532 can be obtained by, for example, magnetizing a ring magnet in multiple poles. Inner periphery portions 534 of the permanent magnets 532 may be non-magnetic materials or non-magnetized portions of magnets. The inner periphery portions 534 serve to hold a rotating shaft 504. Wide portions 545 and 565 of the tips of teeth 544 and 564 of first and second stators 540 and 560 also include magnetic pole surfaces of permanent magnets. This is particularly effective in the case of a surface magnet type with magnetic pole surfaces of permanent magnets exposed to air gaps.

As shown in FIG. 14, assuming that:
the radius of a circle connecting outermost peripheries, relative to the rotating shaft 504, of the wide portions 545 of the first stator 540 is Rho1,
the radius of a circle connecting innermost peripheries, relative to the rotating shaft 504, of the wide portions 545 of the first stator 540 is Rhi1,
the radius of a circle connecting outermost peripheries, relative to the rotating shaft 504, of the wide portions 565 of the second stator 560 is Rho2, and
the radius of a circle connecting innermost peripheries, relative to the rotating shaft 504, of the wide portions 565 of the second stator 560 is Rhi2, $$Rho1 \geq Rto1, Rho2 \geq Rto2, Rhi1 \leq Rti1, \text{ and } Rhi2 \leq Rti2$$

are satisfied.

For this reason, magnetic flux is smoothly transferred from the teeth 544 and 564 to the wide portions 545 and 564 of the first and second stators 540 and 560.

Figure 15:
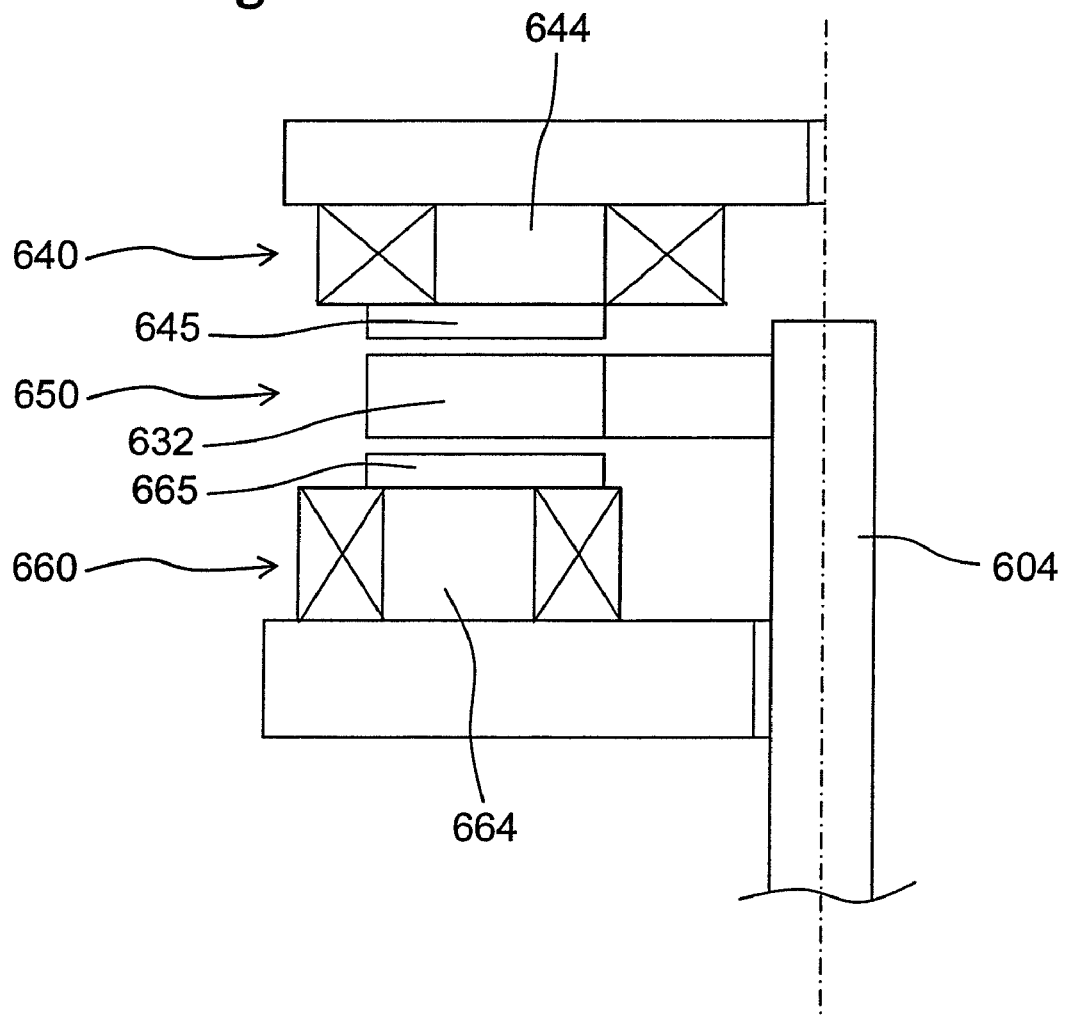
FIG. 15 is a schematic diagram of a longitudinal section of the main part of another variation of the axial gap motor.

Furthermore, FIG. 15 is a schematic diagram of a longitudinal section of the main part of another variation of the axial gap motor. As shown in FIG. 15, wide portions 645 of an upper first stator 640 are the same as wide portions 665 of a lower second stator 660, and the wide portions 645 and 665 face straight permanent magnets 632 of a rotor 650 fixed to a rotating shaft 604. Furthermore, the wide portions 645 and 665 cover the total area of the tips of teeth 644 and 664. There also is an advantage that the wide portions 645 and 665 of the first and second stators 640 and 660 can be used in common.

Figure 16:
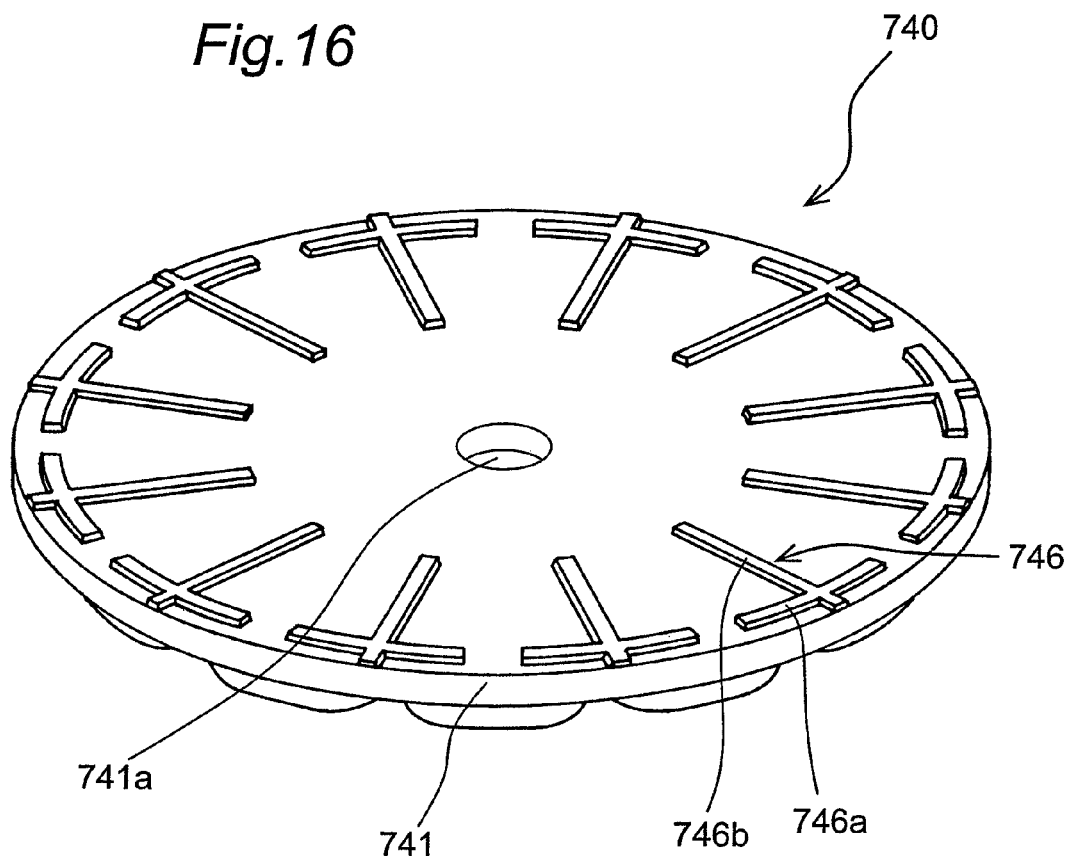
FIG. 16 is a perspective view of a first stator with ribs protruding axially provided on the upper side of a back yoke.

Since the back yoke of the first stator has a small thickness, as shown in FIG. 16, ribs 746 protruding axially may be provided on the back yoke 741 of the first stator 740, preferably on the air gap side of the first stator 740. Furthermore, the ribs 746 are each a combination of an arc-shaped rib 746a provided circumferentially and a linear rib 746b provided radially, but may be either of them. The linear ribs 746b provided radially are more effective when provided on portions having no tooth.

Third Embodiment

Figure 17:
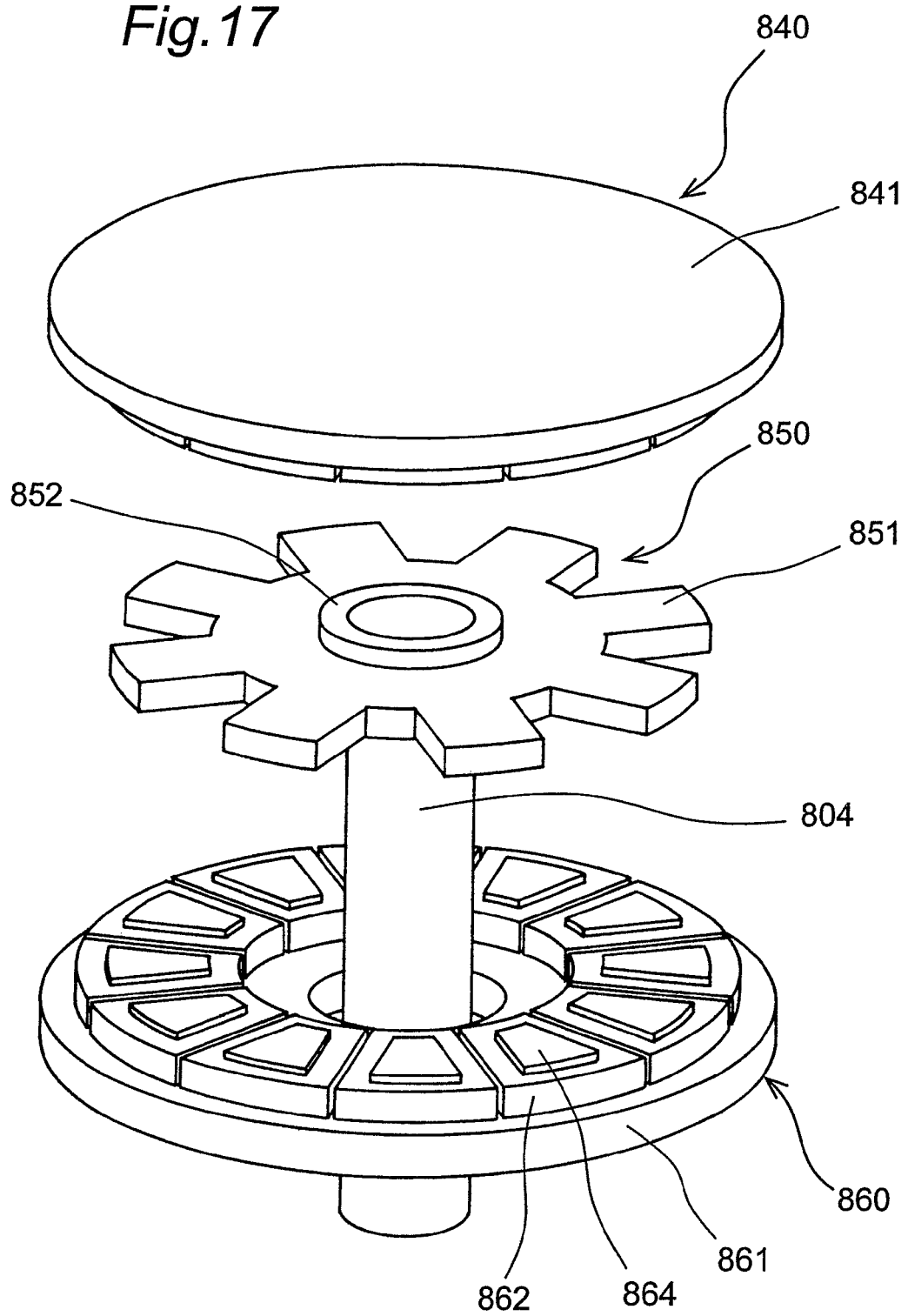
FIG. 17 is a cross-sectional view of a switched reluctance motor according to a third embodiment of the present invention.

FIG. 17 is an exploded perspective view of a motor according to the third embodiment of the present invention.

This motor is a switched reluctance motor. As shown in FIG. 17, a first stator 840 and a second stator 860 face each other through air gaps on both axial sides of a rotor 850 fixed on a rotating shaft 804. Furthermore, the rotating shaft 804 passes through a shaft hole 861a provided in a back yoke 861 of the second stator 860.

The rotor 850 is shaped like a gear wheel with coupled inner periphery portions, and only a non-coupled portion of the rotor 850 faces the teeth 864 of the first and second stators 840 and 860. A coupled portion 852 of the rotor 850 mainly has a function of holding a gear portion 851 and fitting to the rotating shaft 804, and may act as a back yoke partially. In any case, main magnetic flux, that is, magnetic flux coming from the teeth of the first stator 840 arrives at the teeth 864 of the second stator 860 through the gear portion 851. Thus, the coupled portion 852 is little useful as a back yoke. In FIG. 17, the first stator 840 is different from the second stator 860 only in the thickness of the back yoke 841, 861, but may be different from the second stator 860 in positions of teeth, etc. like the first and second embodiments.

What is claimed is:

1. A motor comprising:
a rotating shaft;
a single rotor fixed to the rotating shaft; and
first and second stators arranged on opposite axial sides of the rotor with the first and second stators facing each other through air gaps on the opposite axial sides of the rotor,
each of the first and second stators including
a back yoke,
circumferentially arranged teeth located on an air gap side of a respective one of the back yokes, and
coils wound around the teeth,
the back yoke of the first stator having a portion facing an end face of the rotating shaft,
the back yoke of the second stator having a shaft hole with the rotating shaft passing therethrough,
the back yoke of the first stator having a through hole smaller than an outer diameter of the rotating shaft, the rotating shaft not being received in the through hole of the back yoke of the first stator, and
the back yoke of the first stator having a thickness Ty1 smaller than a thickness Ty2 of the back yoke of the second stator, with the entire back yokes of the first and second stators having respective generally uniform axial thicknesses Ty1 and Ty2.

2. The motor as claimed in claim 1, wherein
the through hole of the back yoke of the first stator is centered on an axis passing through a center of the shaft hole of the back yoke of the second stator.

3. The motor as claimed in claim 2, wherein
an outside radius Ro of the back yoke of the first stator is about the same as an outside radius of the back yoke of the second stator, a radius of the through hole of the back yoke of the first stator is Ri1, a radius of the shaft hole of the back yoke of the second stator is Ri2, and $$(Ro - Ri1)Ty1 = (Ro - Ri2)Ty2.$$

4. The motor as claimed in claim 1, wherein
a magnetic flux passing through magnetic materials of the rotor forms a magnetic circuit axially penetrating the first and second stators.

5. The motor as claimed in claim 1, further comprising
a bearing freely rotatably supporting the rotating shaft with said bearing being located nearer to the second stator than to the rotor.

6. The motor as claimed in claim 1, wherein
the rotor includes permanent magnets.

7. The motor as claimed in claim 1, wherein
the rotor includes permanent magnets arranged in one axial layer and magnetic materials arranged on opposite axial end faces of the permanent magnets, with the magnetic materials being separated per magnetic pole.

8. A compressor equipped with the motor as claimed in claim 1.

9. The motor as claimed in claim 1, wherein
the second stator has an overall axial thickness larger than the overall axial thickness of the first stator.

10. The motor as claimed in claim 9, wherein
the first and second stator teeth having the coils thereon have equal axial thicknesses.

11. The motor as claimed in claim 1, wherein
the first and second stator teeth having the coils thereon have equal axial thicknesses.

12. The motor as claimed in claim 1, wherein $Rto1 < Rto2$ and $Rti1 < Rti2$, where
Rto1 is a radius of a circle connecting outermost peripheries of the teeth of the first stator,
Rti1 is a radius of a circle connecting innermost peripheries of the teeth of the first stator,
Rto2 is a radius of a circle connecting outermost peripheries of the teeth of the second stator, and
Rti2 is a radius of a circle connecting innermost peripheries of the teeth of the second stator.

13. The motor as claimed in claim 12, wherein $(Rto1 - Rti1) > (Rto2 - Rti2)$.

14. The motor as claimed in claim 12, wherein $Wc1 > Wc2$, where
Wc1 is a radial width of the coils of the first stator, and
Wc2 is a radial width of the coils of the second stator.

15. The motor as claimed in claim 14, wherein $Lc1 < Lc2$, where
Lc1 is an axial length of the coils of the first stator and
Lc2 is an axial length of the coils of the second stator.

16. The motor as claimed in claim 15, wherein $Wc1 \cdot Lc1 \approx Wc2 \cdot Lc2$.

17. The motor as claimed in claim 12, wherein
each of the first and second stators has respective wide portions on air gap side surfaces of tips of the teeth, and $Rho1 \geq Rto1$, $Rho2 \geq Rto2$, $Rhi1 \leq Rti1$, and $Rhi2 \leq Rti2$, where
Rho1 is a radius of a circle connecting outermost peripheries of the wide portions of the first stator,
Rhi1 is a radius of a circle connecting innermost peripheries of the wide portions of the first stator,
Rho2 is a radius of a circle connecting outermost peripheries of the wide portions of the second stator, and
Rhi2 is a radius of a circle connecting innermost peripheries of the wide portions of the second stator.

18. The motor as claimed in claim 12, wherein $Rro1 < RRo2$, and $Rri1 < RRi2$, where
RRo1 is a radius of a circle connecting outermost peripheries of magnetic materials of the rotor at portions facing the first stator of the rotor,
RRi1 is a radius of a circle connecting innermost peripheries of the magnetic materials of the rotor at portions facing the first stator,
RRo2 is a radius of a circle connecting outermost peripheries of the magnetic materials of the rotor at portions facing the second stator, and
RRi2 is a radius of a circle connecting innermost peripheries of the magnetic materials of the rotor at portions facing the second stator.

19. The motor as claimed in claim 12, wherein $RRo1 \approx Rto1$, $RRo2 \approx Rto2$, $RRi1 \approx Rti1$, and $RRi2 \approx Rti2$, where
RRo1 is a radius of a circle connecting outermost peripheries of magnetic materials of the rotor at portions facing the first stator,
RRi1 is a radius of a circle connecting innermost peripheries of the magnetic materials of the rotor at portions facing the first stator,
RRo2 is a radius of a circle connecting outermost peripheries of the magnetic materials of the rotor at portions facing the second stator, and
RRi2 is a radius of a circle connecting innermost peripheries of the magnetic materials of the rotor at portions facing the second stator.

20. The motor as claimed in claim 12, wherein $RRo \geq Rto1$, $RRo \geq Rto2$, $Rti1 \geq RRi$, and $Rti2 \geq RRi$, where
RRo is a radius of a circle connecting outermost peripheries of magnetic materials of the rotor at portions facing the first and second stators, and
RRi is a radius of a circle connecting innermost peripheries of the magnetic materials of the rotor at portions facing the first and second stators.

21. The motor as claimed in claim 1, wherein the back yoke of the first stator includes axially protruding ribs.

22. A compressor comprising:
a closed container to which a suction pipe and a discharge pipe for a refrigerant are connected:
a compressor mechanism located in the closed container; and
a motor located on one side of the compression mechanism in the closed container and configured to drive the compression mechanism, the motor including
a rotating shaft, the motor being configured to drive the compression mechanism through the rotating shaft,
a single rotor fixed to one end of the rotating shaft, and
first and second stators arranged on opposite axial sides of the rotor with the first and second stators facing each other through air gaps on the opposite axial sides of the rotor, the second stator being located between the compression mechanism and the first stator, each of the first and second stators including
a back yoke,
circumferentially arranged teeth located on an air gap side of a respective one of the back yokes, and
coils wound around the teeth,
the back yoke of each of the first and second stators having two axial end surfaces and an outer peripheral surface, the outer peripheral surface being fixed to an inner surface of the closed container,
the back yoke of the first stator having a portion facing an end face of the rotating shaft,
the back yoke of the second stator having a shaft hole with the rotating shaft passing therethrough,
the back yoke of the first stator having a through hole smaller than an outer diameter of the rotating shaft, the rotating shaft not being received in the through hole of the back yoke of the first stator, and
the back yoke of the first stator having a thickness Ty1 smaller than a thickness Ty2 of the back yoke of the second stator, with the entire back yokes of the first and second stators having respective generally uniform axial thicknesses Ty1 and Ty2.

23. The compressor as claimed in claim 22, wherein
a sectional area of the back yoke of the first stator along a plane including the axis of the back yoke of the first stator is the same as a sectional area of the back yoke of the second stator along the plane.

24. The compressor as claimed in claim 22, wherein the through hole of the back yoke of the first stator is centered on an axis passing through a center of the shaft hole of the back yoke of the second stator.

25. The compressor as claimed in claim 22, wherein the motor has a bearing located between the compression mechanism and the rotor to support the rotating shaft.

26. The compressor as claimed in claim 22, wherein the second stator has an overall axial thickness larger than the overall axial thickness of the first stator.

27. The compressor as claimed in claim 26, wherein the first and second stator teeth having the coils thereon have equal axial thicknesses.

28. The compressor as claimed in claim 22, wherein the first and second stator teeth having the coils thereon have equal axial thicknesses.

29. A motor comprising:
a rotating shaft;
a single rotor fixed to the rotating shaft; and
first and second stators arranged on opposite axial sides of the rotor with the first and second stators facing each other through air gaps on the opposite axial sides of the rotor,
each of the first and second stators including
   a back yoke,
   circumferentially arranged teeth located on an air gap side of a respective one of the back yokes, and
   coils wound around the teeth,
   the back yoke of the first stator having a portion facing an end face of the rotating shaft,
   the back yoke of the second stator having a shaft hole with the rotating shaft passing therethrough, and
   the back yoke of the first stator having a thickness Ty1 smaller than a thickness Ty2 of the back yoke of the second stator,
the second stator having an overall axial thickness larger than an overall axial thickness of the first stator, and the first and second stator teeth with the coils thereon having equal axial thicknesses.

30. A compressor comprising:
a closed container to which a suction pipe and a discharge pipe for a refrigerant are connected:
a compressor mechanism located in the closed container; and
a motor located on one side of the compression mechanism in the closed container and configured to drive the compression mechanism, the motor including
   a rotating shaft, the motor being configured to drive the compression mechanism through the rotating shaft,
   a single rotor fixed to one end of the rotating shaft, and
   first and second stators arranged on opposite axial sides of the rotor with the first and second stators facing each other through air gaps on the opposite axial sides of the rotor, the second stator being located between the compression mechanism and the first stator, each of the first and second stators including
      a back yoke,
      circumferentially arranged teeth located on an air gap side of a respective one of the back yokes, and
      coils wound around the teeth,
      the back yoke of each of the first and second stators having two axial end surfaces and an outer peripheral surface, the outer peripheral surface being fixed to an inner surface of the closed container,
      the back yoke of the first stator having a portion facing an end face of the rotating shaft,
      the back yoke of the second stator having a shaft hole with the rotating shaft passing therethrough, and
      the back yoke of the first stator having a thickness Ty1 smaller than a thickness Ty2 of the back yoke of the second stator,
   the second stator having an overall axial thickness larger than an overall axial thickness of the first stator, and
   the first and second stator teeth with the coils thereon having equal axial thicknesses.

\* \* \* \* \*